(12) United States Patent
Sakata et al.

(10) Patent No.: US 7,079,950 B2
(45) Date of Patent: Jul. 18, 2006

(54) LOCATION INFORMATION CONVERSION DEVICE, CONTROL METHOD THEREFOR, LOCATION INFORMATION PROVIDING SYSTEM USING THEM, AND CONTROL METHOD THEREFOR

(75) Inventors: Kazuhiro Sakata, Tokyo (JP); Akihisa Kurashima, Tokyo (JP)

(73) Assignee: NEC Corporation, Tokyo (JP)

( * ) Notice: Subject to any disclaimer, the term of this patent is extended or adjusted under 35 U.S.C. 154(b) by 518 days.

(21) Appl. No.: 10/237,723

(22) Filed: Sep. 10, 2002

(65) Prior Publication Data

US 2003/0050755 A1  Mar. 13, 2003

(30) Foreign Application Priority Data

Sep. 12, 2001  (JP) ............................. 2001-275852
Nov. 8, 2001  (JP) ............................. 2001-342711

(51) Int. Cl.
*G06F 13/00*  (2006.01)
*G01C 21/26*  (2006.01)

(52) U.S. Cl. ...................... 701/300; 701/207; 701/214; 708/203; 708/204

(58) Field of Classification Search ................ 701/300, 701/213, 207, 210, 214; 713/200; 708/203, 708/204; 342/357.02, 357.06, 357.1; 455/456.1, 455/456.3, 456.6, 414.1, 414.2
See application file for complete search history.

(56) References Cited

U.S. PATENT DOCUMENTS 5,809,424 A * 9/1998 Eizenhoefer ............. 455/456.2
6,327,535 B1 * 12/2001 Evans et al. ................ 701/300
6,480,784 B1 * 11/2002 Mizuno ...................... 701/207
6,813,501 B1 * 11/2004 Kinnunen et al. ........ 455/456.2
2002/0051540 A1 * 5/2002 Glick et al. ................ 380/258
2003/0065934 A1 * 4/2003 Angelo et al. .............. 713/200

FOREIGN PATENT DOCUMENTS

| EP | 1 126 376 | 8/2001 |
|---|---|---|
| JP | 10-170625 | 6/1998 |
| JP | 11-150931 | 5/1999 |
| JP | 2000-517050 | 12/2000 |
| JP | 2001-103537 | 4/2001 |
| WO | WO 01/41468 A2 | 6/2001 |

OTHER PUBLICATIONS

European Search Report dated Sep. 22, 2004.

* cited by examiner

*Primary Examiner*—Tan Q. Nguyen
(74) *Attorney, Agent, or Firm*—McGinn IP Law Group, PLLC

(57) ABSTRACT

A location information conversion device which can ensure privacy protection of a search object. Upon receiving a request with a designated accuracy from an input/output section, a location information generating section acquires location information from a location measurement section and supplies the location information to an accuracy adjustment section, together with the designated accuracy. The accuracy adjustment section converts the location information into location information of an accuracy equal to or lower than the designated accuracy and returns the resulting location information to the location information generating section. The location information generating section sends the location information whose accuracy has been converted to the requesting party via an input/output section. This ensures protection of privacy, since the location information about a search object is converted into location information of an accuracy equal to or lower than the designated accuracy.

65 Claims, 21 Drawing Sheets

| UNIT SYSTEM | ACCURACY |
|---|---|
| LATITUDE / LONGITUDE | ONE DECIMAL PLACE |
| ADDRESS STRING | CITY / TOWN / VILLAGE HOUSE NUMBER / PREFECTURE |
| ADDRESS STRING | 10 CHARACTERS |
| ADDRESS STRING | POPULATION OF 10,000 OR MORE |

FIG. 10

```
ACCURACY
PARAMETER : UNIT (ADDRESS STRING)
        1 : HOUSE NUMBER
        2 : TOWN NAME
        3 : WARD NAME
        4 : CITY / TOWN / VILLAGE NAME
        5 : PREFECTURE NAME
        6 : DISTRICT NAME
```

FIG. 11

```
AREA (LATITUDE RANGE, LONGITUDE RANGE) : ACCURACY PARAMETER
    (N35.48~N35.49, E139.27~E139.28)   :   3
    (N35.48~N35.49, E139.28~E139.29)   :   3
    (N35.48~N35.49, E139.29~E139.30)   :   4
    (N35.48~N35.49, E139.30~E139.31)   :   2
    (N35.48~N35.49, E139.31~E139.32)   :   3
                    · · · ·
```

FIG. 12

| AREA | : | ACCURACY PARAMETER |
|---|---|---|
| MIYAMAE WARD, KAWASAKI CITY, KANAGAWA PREFECTURE | : | 2 |
| TAKATSU WARD, KAWASAKI, CITY, KANAGAWA PREFECTURE | : | 1 |
| TAMA WARD, KAWASAKI CITY, KANAGAWA PREFECTURE | : | 3 |
| NAKAHARA WARD, KAWASAKI CITY, KANAGAWA PREFECTURE | : | 2 |
| SAIWAI WARD, KAWASAKI CITY, KANAGAWA PREFECTURE | : | 3 |
| . . . . | | |

| AREA | : ACCURACY PARAMETER |
|---|---|
| KANAGAWA WARD, YOKOHAMA CITY | : 3 |
| YOKOHAMA CITY EXCLUDING AOBA WARD | : 2 |
| NOGAWA, MIYAMAE WARD, KAWASAKI CITY | : 4 |
| KAWASAKI CITY EXCLUDING THE ABOVE | : 3 |
| YOKOSUKA CITY | : 4 |

FIG. 18

CONVERTED - INFORMATION CACHE
(N35.48~N35.49、E139.27~E139.28) : (N35.48、E139.27)

FIG. 20A

PATTERN A

| TIME PERIOD | : | ACCURACY PARAMETER |
|---|---|---|
| 0 : 00~ 9 : 00 | : | 4 |
| 9 : 00~12 : 00 | : | 2 |
| 12 : 00~13 : 00 | : | 1 |
| 13 : 00~17 : 00 | : | 2 |
| 17 : 00~21 : 00 | : | 3 |
| 21 : 00~24 : 00 | : | 4 |

FIG. 20B

PATTERN B

| TIME PERIOD | : | ACCURACY PARAMETER |
|---|---|---|
| 0 : 00~ 6 : 00 | : | 2 |
| 6 : 00~ 8 : 00 | : | 5 |
| 8 : 00~12 : 00 | : | 1 |
| 12 : 00~13 : 00 | : | 3 |
| 13 : 00~18 : 00 | : | 4 |
| 18 : 00~24 : 00 | : | 3 |

FIG. 20C

PATTERN C

| TIME PERIOD | : | ACCURACY PARAMETER |
|---|---|---|
| 0 : 00~ 7 : 00 | : | 1 |
| 7 : 00~ 9 : 00 | : | 4 |
| 9 : 00~17 : 00 | : | 1 |
| 17 : 00~19 : 00 | : | 4 |
| 19 : 00~22 : 00 | : | 2 |
| 22 : 00~24 : 00 | : | 1 |

FIG. 21

| AREA | : | PATTERN |
|---|---|---|
| MIYAMAE WARD, KAWASAKI CITY | : | C |
| TAKATSU WARD, KAWASAKI CITY | : | B |
| TAMA WARD, KAWASAKI CITY | : | A |
| NAKAHARA WARD, KAWASAKI CITY | : | B |
| SAIWAI WARD, KAWASAKI CITY | : | A |
| ・・・・・・ | | |

LOCATION INFORMATION CONVERSION DEVICE, CONTROL METHOD THEREFOR, LOCATION INFORMATION PROVIDING SYSTEM USING THEM, AND CONTROL METHOD THEREFOR

BACKGROUND OF THE INVENTION

1. Field of the Invention

The present invention relates to a location information conversion device, control method therefor, a location information providing system using them, and control method therefor. More particularly, the present invention relates to a location information conversion system which converts input location information into location information of a predetermined accuracy and produces output, and a location information providing system using the location information conversion system.

2. Description of the Prior Art

Recent years, various services have been implemented using location information on users of portable terminals. For example, a service is available which provides information related to an area around the user's current location. Configuration of a location information providing system for this conventional service is shown in FIG. 26. In the figure, reference numeral 540 denotes a portable terminal and reference numerals 551, 552, 553, . . . , and 55n denote location-related information providers that provide information to the portable terminal 540. The portable terminal 540 and the location-related information providers 551, 552, 553, . . . , 55n are connected via a mobile communications network 560.

As the user uses the portable terminal 540, location information which indicates the current location of the user is sent to the location-related information providers 551, 552, 553, . . . , 55n via the mobile communications network 560. Then, the user can readily obtain information relevant to an area around that location, including shop information about eating and drinking places, amusement facilities, and the like, traffic information, and information about nearby stations, which is sent to the user's portable terminal 540 from the location-related information providers 551, 552, 553, . . . , 55n via the mobile communications network 560.

The portable terminal 540 used for this service is equipped with a location information conversion device 500 to send the location-related information which indicates the current location of the user to the location-related information providers 551, 552, 553, . . . , 55n. Internal configuration of the location information conversion device 500 is shown in FIG. 27, in which the location information conversion device 500 consists of an input/output section 510 which inputs and outputs information from/to the outside, a location measurement section 520 which acquires location information about a search object, and a location information providing section 530 which provides location information to the outside.

Incidentally, possible methods for acquiring location information in the location measurement section 520 include methods which employ GPS (Global Positioning System), methods which employ a portable telephone network, and methods which employ wireless tags and tag detectors.

Next, operation of the conventional location information conversion device will be described in detail with reference to FIG. 27. The location information conversion device 500 receives a request for location information from outside via the input/output section 510. Then, the location information providing section 530 acquires location information about a search object from the location measurement section 520 and outputs it to the requesting party via the input/output section 510. In this way, it is possible to provide location information about a search object in response to a request from the outside.

With the conventional service described above, location-related information on the user is conveyed as it is to the location-related information providers 551, 552, 553, . . . , 55n via the mobile communications network 560. Consequently, information about whereabouts of the user utilizing the portable terminal 540 is fully conveyed to the location-related information providers unless some measures are taken. This raises a problem of privacy protection of the user with respect to his/her location, especially when the object whose location information is retrieved is a human being.

To protect privacy in the use of the conventional location information conversion device 500, location information about a search object is provided to outsiders only when the search object is outside a particular area designated in advance, as disclosed in Japanese Patent No. 3111063.

However, a system in which location information is provided to location-related information providers only when the searcher is outside a particular area as disclosed in the above patent has the drawback that when the searcher is within the particular area, the searcher cannot receive location-related information, and thus cannot get the full benefits of the location-related information providing service. It also has the drawback that when the searcher is outside the particular area, privacy cannot be protected at all.

Also, when actually receiving the service, the searcher may want to vary the accuracy of his/her location information to be conveyed to location-related information providers according to his/her present location. For example, some searchers do not want to send detailed location information around their houses, but want to send detailed location information in sightseeing areas or other travel destinations they are not familiar with in order to be provided with detailed location-related information.

In such a case, the conventional location information conversion device which gives no consideration to privacy protection has the problem that since it conveys location information about the search object to the location-related information providers as it is, the searcher's location information is conveyed to the location-related information providers in detail even if the searcher does not desire to be provided with detailed location-related information.

Also, the position detection system disclosed in the patent described above only judges whether to provide location information to outsiders depending on whether the search object is within a particular area designated in advance. It is not possible to set the accuracy of location information to be provided to outsiders or change the accuracy according to the present location of the search object.

BRIEF SUMMARY OF THE INVENTION

The present invention has been made to solve the prior art problems described above. Its object is to provide a location information conversion device, control method therefor, a location information providing system using them, and control method therefor which allow users to take full advantage of location-related information providing services while protecting privacy.

A location information conversion device according to the present invention comprises location information conversion means for converting an input location information into a location information of an accuracy equal to or lower than a pre-designated accuracy and outputs the same. Alternatively, it comprises location information conversion means for converting an input location information into a location information of an accuracy equal to or lower than a pre-designated accuracy in a pre-designated first unit system and outputs the same.

A location information conversion method according to the present invention comprises a location information conversion step of converting an input location information into a location information of an accuracy equal to or lower than a pre-designated accuracy and outputting the same. Alternatively, it comprises a location information conversion step of converting an input location information into a location information of an accuracy equal to or lower than a pre-designated accuracy in a pre-designated first unit system and a step of outputting the same.

A recording medium according to the present invention contains a program which makes a computer execute operation of a location information conversion method for converting an input location information and outputting the same, wherein the above-described program comprises a location information conversion step of converting the input location information into a location information of an accuracy equal to or lower than a pre-designated accuracy and a step of outputting the same. Alternatively, the program comprises a location information conversion step of converting an input location information into a location information of an accuracy equal to or lower than a pre-designated accuracy in a pre-designated first unit system and a step of outputting the same.

In a location information providing system according to the present invention, the location information conversion device described above and a location-related information providing device which provides location-related information related to the input location information based on a location information output from the location information conversion device are connected via a communications network.

A location information conversion device according to the present invention comprises location information conversion means for converting the accuracy of an input location information according to the location and outputting the same.

An operation control method for a location information conversion device according to the present invention is an operation control method for a location information conversion device which outputs an input location information after converting it according to a predetermined accuracy, comprising a location information conversion step of converting the accuracy of the input location information according to the location and a step of outputting the same.

Another recording medium according to the present invention contains a program which makes a computer control the operation of a location information conversion device for outputting an input location information after converting it according to a predetermined accuracy, wherein the program comprises a location information conversion process of converting the accuracy of the input location information according to the location and a process of outputting the same.

Another location information providing system according to the present invention is a location information providing system in which a location information conversion device which converts an input location information into a location information of a predetermined accuracy and outputs the same, and a location-related information providing device which provides location-related information related to the input location information based on a location information output from the location information conversion device are connected via a communications network, wherein the location information conversion device converts the accuracy of the input location information according to the location and outputs the same.

An operation control method according to the present invention is an operation control method for a location information providing system in which a location information conversion device which converts an input location information into a location information of a predetermined accuracy and outputs the same, and a location-related information providing device which provides location-related information related to said input location information based on a location information output from the location information conversion device are connected via a communications network, wherein said location information conversion device comprises a location information conversion step of converting the accuracy of said input location information according to the location and a step of outputting the same.

Now the operation of the present invention will be described. Upon receiving a request with an accuracy designated, a location information generating section acquires an location information from a location measurement section and supplies the location information to an accuracy adjustment section together with the designated accuracy. The accuracy adjustment section converts the location information into location information of an accuracy equal to or lower than the designated accuracy and returns the resulting location information to the location information generating section. The location information generating section sends the location information whose accuracy has been converted to the requesting party on the outside via an input/output section. This ensures protection of privacy since the location information about a search object is converted into location information of an accuracy equal to or lower than the designated accuracy.

Also, a location information providing section inputs the location information acquired by the location measurement section into an accuracy determination section. Then, the accuracy determination section acquires an accuracy parameter which corresponds to this location information from a location-accuracy correspondence information storage which stores correspondence between location information and accuracy parameters. The location information providing section inputs the acquired location information and accuracy parameter into a location information conversion section, acquires location information which has been converted according to the accuracy represented by the accuracy parameter determined by the accuracy determination section, and provides the location information to the outside via the input/output section. This makes it possible to provide location information of an accuracy corresponding to the given location, and thereby ensures privacy protection of the search subject.

It is judged whether area information which corresponds to the location information acquired by the location measurement section is stored in a converted-information cache as area information once converted. If such area information exists, the location information providing section provides the location information which corresponds to the area information to the outside via the input/output section. If no area information which corresponds to the location information exists in the converted-information cache, the location information providing section acquires the accuracy parameter for this location information from the location-accuracy correspondence information storage, acquires the area information which corresponds to the location information from an area-designated accuracy determination section, stores location information and area information acquired by inputting the acquired location information and accuracy parameter to an area-designated location information conversion section in the converted-information cache, and provides the resulting location information to the outside via the input/output section. This makes it possible to convert input location information quickly if location information about the given location or neighboring locations has been converted once in the past.

BRIEF DESCRIPTION OF THE DRAWINGS

FIG. 10 is a diagram showing another example of meanings represented by accuracy parameters according to the embodiment in FIG. 8;

FIG. 11 is a diagram showing an example of data stored in a location-accuracy correspondence information storage according to the embodiment in FIG. 8;

FIG. 12 is a diagram showing another example of data stored in the location-accuracy correspondence information storage according to the embodiment in FIG. 8;

FIG. 18 is a diagram showing an example of information data cached in a converted-information cache according to the embodiment in FIG. 14;

FIG. 20 is a diagram showing patterns of relationships between accuracy parameters and time periods;

FIG. 21 is a diagram showing combinations of areas and the patterns in which accuracy parameters corresponds to time;

DETAILED DESCRIPTION OF THE PREFERRED EMBODIMENTS

Next, embodiments of the present invention will be described in detail with reference to the drawings. In the following description, a person or thing whose location information is acquired will be referred to as a search object while a manager who manages a search object or a owner who owns a search object will be referred to as search subject. Thus, if a search object is a person, the search object and search subject may be the same person.

Figures 1, 2:
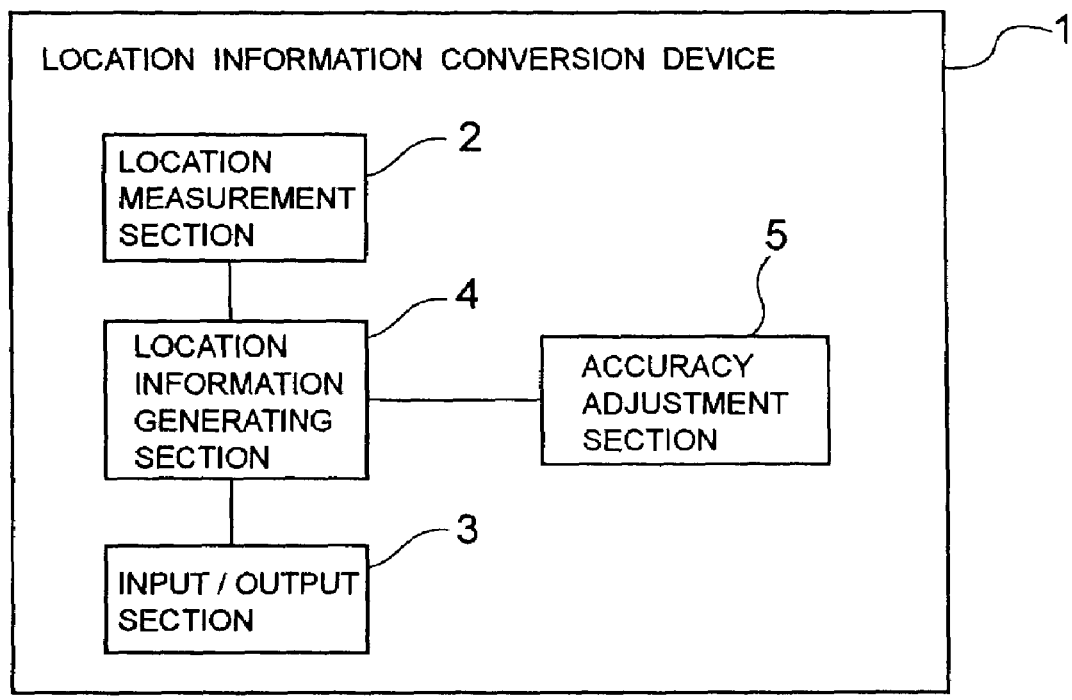
FIG. 1 is a block diagram showing configuration of a location information conversion device according to a first embodiment of the present invention.
FIG. 2 is a diagram showing an example of relationship between unit systems and accuracy parameters according to the embodiment in FIG. 1.

Now a first embodiment of the present invention will be described. FIG. 1 is a diagram showing configuration of a location information conversion device according to the first embodiment of the present invention. In the figure, the location information conversion device 1 consists of a location measurement section 2 which has a function to measure the location of a search object, an input/output section 3 which has input/output functions, a location information generating section 4 which has a function to generate location information in response to a request from the outside, and an accuracy adjustment section 5 which has a function to convert the accuracy of location information. The term "outside" here means users of the location information conversion device 1 or other devices connected to the location information conversion device 1.

The location measurement section 2 has a function to measure the location of an object and output the resulting information using a certain method for expression or a certain unit. Technologies which implement location measurement in the location measurement section 2 includes methods employing a public network, and methods employing wireless tags and tag detectors as described above, but any method may be used as long as it can measure the location of a search object. Alternatively, location measurement may be implemented by a setup in which the location measurement section 2 acquires location information by communicating with a location measurement device provided outside the location information conversion device 1.

Also, location measurement may be implemented by a setup in which the location measurement section 2 acquires the latest location information stored in a location measurement device provided outside the location information conversion device 1 to measure and record the locations of search objects periodically. For example, if the location measurement section 2 is a GPS, information about a location is output in the latitude/longitude unit. The method or unit used to express location information is referred to as a unit system. The accuracy of the location information output by the location measurement section 2 depends on external factors such as functions of the location measurement section 2 and the measurement environment of locations.

The accuracy adjustment section 5 has a function to accept input of location information and an accuracy parameter, convert the location information into location information of an accuracy equal to or lower than the accuracy represented by the accuracy parameter, and output the resulting location information. Incidentally, the unit system for location information which the accuracy adjustment section 5 can process is the same unit system as that of the location information output by the location measurement section 2. The accuracy parameter here is a piece of information which represents accuracy of location information. The method of describing the accuracy parameter depends on the unit system of location information. For example, if the unit system for input location information is "latitude and longitude in degrees," examples of the accuracy parameter include "one decimal place in degrees" and "two decimal places in degrees."

FIG. 2 shows an example of relationship between unit systems and accuracy parameters. When the unit system is "latitude and longitude" the accuracy parameter (accuracy information) may be "one decimal place." If the unit system is "address string," the accuracy parameter may be "city/town/village" (display accuracy up to city, town, and village), "house number" (display accuracy up to house number), or "prefecture" (display accuracy up to prefecture); "10 characters" (display accuracy up to 10 characters); or "population of 10,000 or more" (address display accuracy of a population of 10,000 or more).

If input location information has a higher accuracy than a designated accuracy, the accuracy adjustment section 5 produces output by reducing the accuracy of the location information to the designated accuracy. If input location information has a lower accuracy than a designated accuracy, the location information is output as it is.

Figure 3:
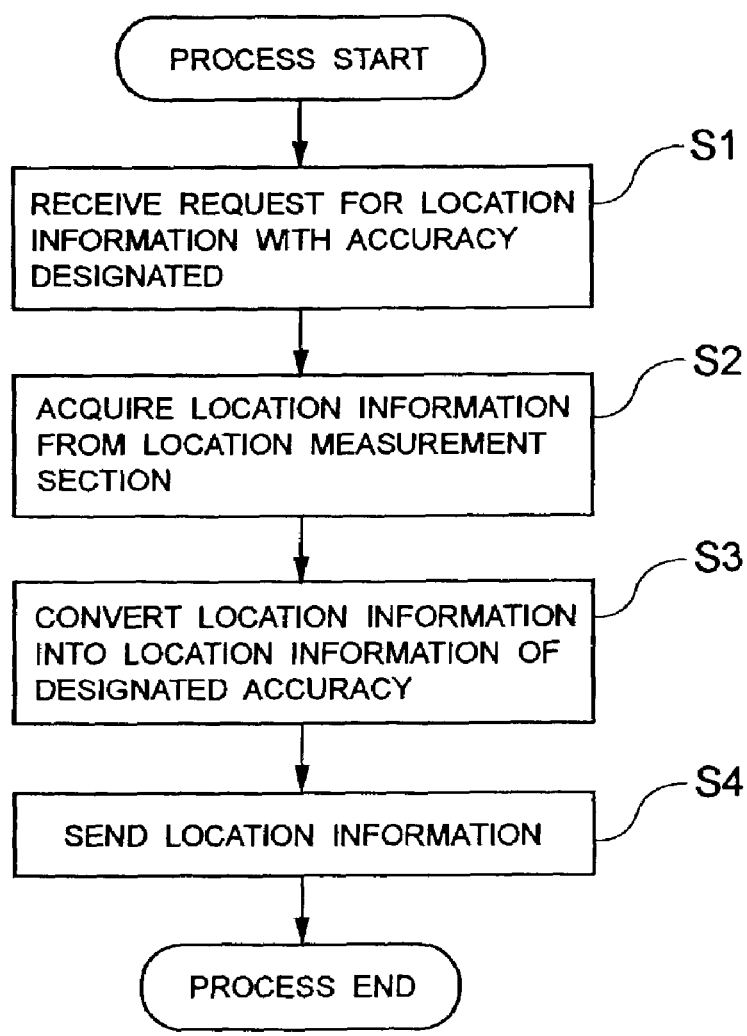
FIG. 3 is a flowchart showing a flow of processes performed by a location information generating section according to the embodiment in FIG. 1.
Figure 4:
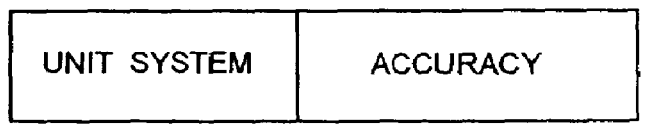
FIG. 4 is a diagram showing an example of a request with an accuracy according to the embodiment in FIG. 1.

Next, operation of the location information conversion device 1 will be described in detail with reference to drawings. A flow of processes performed by the location information generating section 4 will be described below with reference to FIG. 3. First, the location information generating section 4 receives a request for location information with an accuracy designated by an accuracy parameter, from the outside via the input/output section 3 (Step S1). The request for location information with an accuracy designated has a format shown in FIG. 4. "Unit system" in FIG. 4 is the unit system for location information while "accuracy" is apiece of information (accuracy parameter) which represents the conversion accuracy of input location information.

Next, the location information generating section 4 requests location measurement processing to the location measurement section 2 and receives information about measured location of the object (Step S2). Then, the location information generating section 4 inputs the location information acquired in Step S2 and the accuracy parameter entered in Step S1, into the accuracy adjustment section 5 and acquires the converted location information output by the accuracy adjustment section 5 (Step S3). Finally, the location information generating section 4 sends the location information converted in Step S3 to the requesting party via the input/output section 3 (Step S4).

By means of the above processes, the location information conversion device 1 can provide location information whose accuracy is limited based on the designated accuracy parameter. This prevents the location information conversion device from providing location information about an object more accurate than necessary, and thereby ensures privacy protection.

Figure 5:
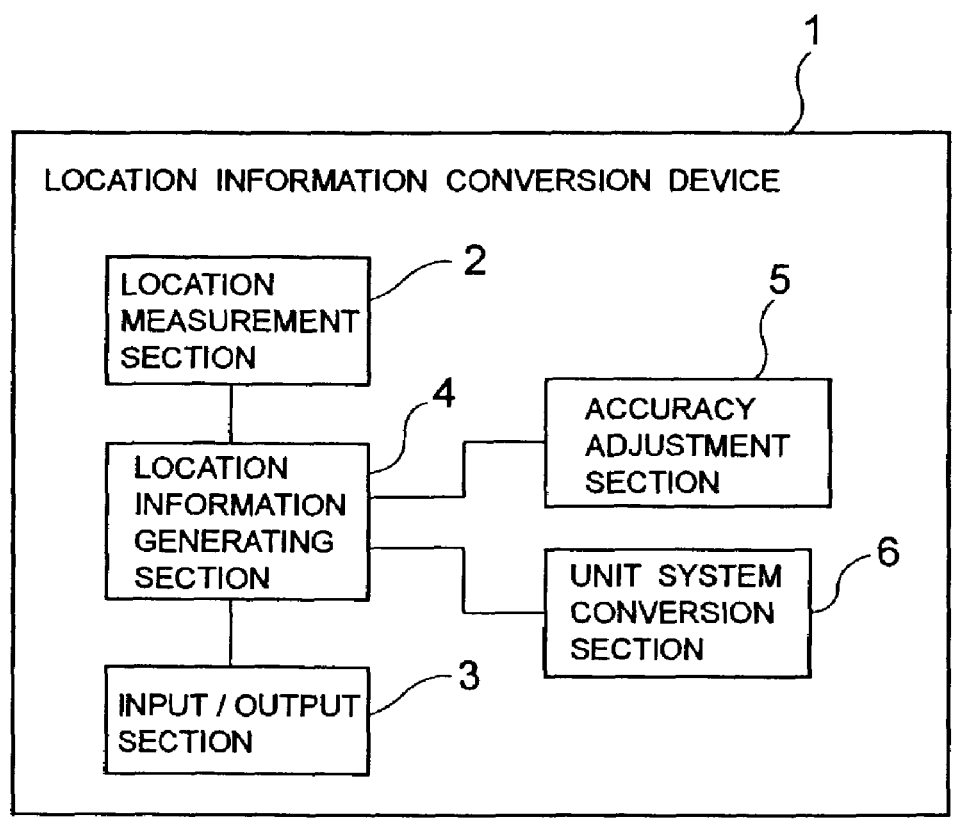
FIG. 5 is a block diagram showing configuration of a location information conversion device according to a second embodiment of the present invention.

Next, a second embodiment of the present invention will be described. FIG. 5 is a diagram showing configuration of a location information conversion device according to the second embodiment of the present invention. Components equivalent to components in FIG. 1 are denoted by the corresponding reference numerals. In FIG. 5, the location information conversion device 1 has a unit system conversion section 6 for converting the unit system for location information. The rest of the configuration is equivalent to that of the first embodiment.

The unit system conversion section 6 has a function to accept input of location information and a unit system and convert the location information into location information expressed in this unit system. For example, if location information expressed as "latitude 35.521 N and longitude 139.61 E" in the "latitude/longitude" unit system indicates the same physical location as does location information expressed as "4-1 Miyazaki, Miyamae Ward, Kawasaki City, Kanagawa Prefecture" in the "address string" unit, when the unit system conversion section 6 accepts input of the location information "latitude 35.521 N and longitude 139.61 E" and the unit system "address string," it outputs the location information "4-1 Miyazaki, Miyamae Ward, Kawasaki City, Kanagawa Prefecture."

The type of unit system which can be converted by the unit system conversion section 6 depends on the location information generating section 4. Besides, there may be two or more unit systems which can be converted by the unit system conversion section 6. In the location information conversion device 1 according to the second embodiment, the unit systems which can be handled by the accuracy adjustment section 5 are the unit systems which can be converted by the unit system conversion section 6. Therefore, if there are two or more unit systems which can be converted by the unit system conversion section 6, the accuracy adjustment section 5 can convert location information in any of these unit systems.

Figure 6:
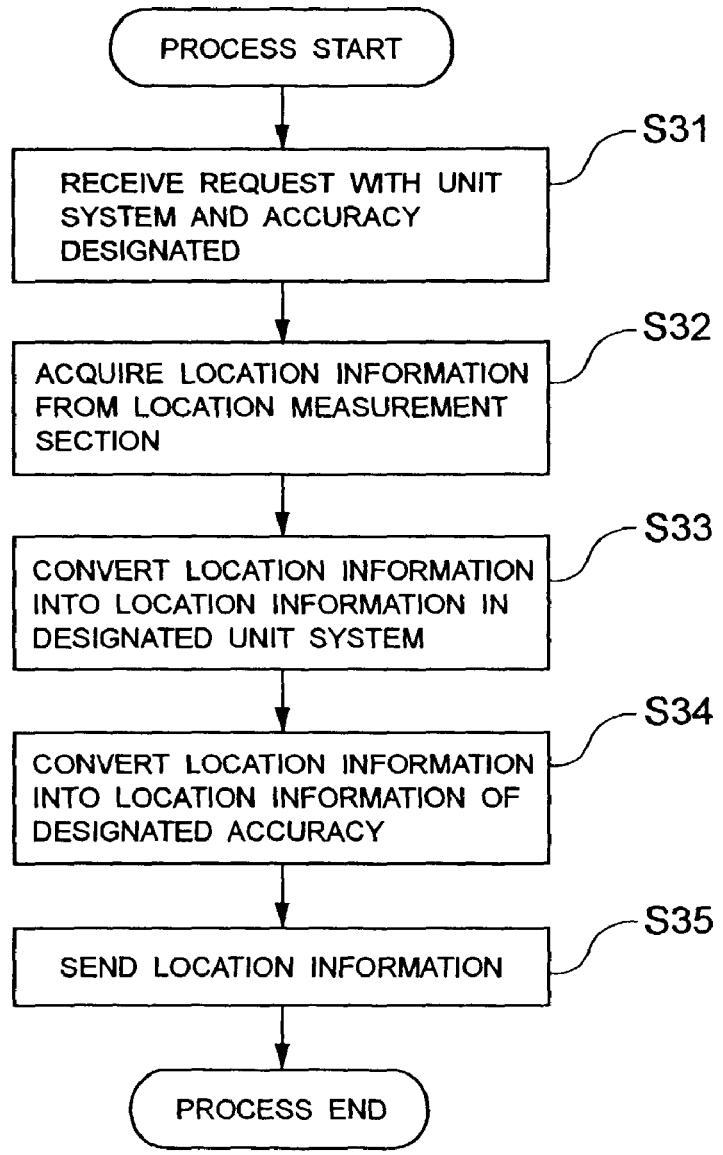
FIG. 6 is a flowchart showing a flow of processes performed by a location information generating section according to the embodiment in FIG. 5.

Next, operation of the location information conversion device 1 will be described in detail with reference to drawings. A flow of processes performed by the location information generating section 4 will be described below with reference to FIG. 6. First, the location information generating section 4 receives a request for location information together with a unit system and an accuracy designated by an accuracy parameter from the outside via the input/output section 3 (Step S31). A format of the request in this case is equivalent to the one shown in FIG. 4. Then, the location information generating section 4 requests location measurement processing to the location measurement section 2 and receives information about measured location of the object (Step S32).

Next, the location information generating section 4 inputs the location information acquired in Step S32 and the unit system entered in Step S31, into the unit system conversion section 6 and acquires the converted location information output by the unit system conversion section 6 (Step S33). Then, the location information generating section 4 inputs the location information acquired in Step S33, and the accuracy parameter entered in Step S31, into the accuracy adjustment section 5 and acquires the converted location information output by the accuracy adjustment section 5 (Step S34). Finally, the location information generating section 4 sends the location information converted in Step S34 to the requesting party via the input/output section 3 (Step S35).

By means of the above processes, the location information conversion device 1 can provide location information whose accuracy is limited based on the unit system and designated accuracy parameter. This prevents the location information conversion device from providing location information about an object more accurate than necessary, and thereby ensures privacy protection, as in the case of the first embodiment. Furthermore, this embodiment offers the benefits that the unit system for the results of location measurement does not depend on the location measurement section.

Figure 7:
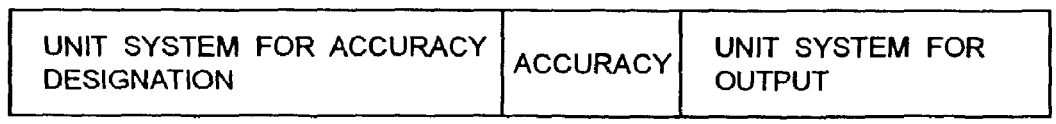
FIG. 7 is a diagram showing an example of a request with an accuracy according to the embodiment in FIG. 5.

In the second embodiment, it is possible to allow a request comprising a designation of the unit system for the location information output by the location information generating section 4. In that case, the location information generating section 4 accepts input of two unit systems and an accuracy parameter. FIG. 7 shows an example of a format of the request, which allows three entries to be designated: "unit system for accuracy designation," "accuracy," and "unit system for output."

Next, the location information generating section 4 converts the unit system in Step S33 using the input "unit system for accuracy designation." Then, the location information generating section 4 converts the location information acquired in Step S34 into location information in the "unit system for output" by the unit system conversion section 6 to output the resulting location information to the outside via the input/output section 3. In this way, the unit system for accuracy designation and the unit system for output can be designated separately.

In the first and second embodiments described above, the location information conversion device 1 accepts designation of an accuracy parameter when receiving a request for location information. Alternatively, the location information conversion device 1 may accept designation of an accuracy parameter from a particular user or device in advance and always use that accuracy parameter when generating location information subsequently. This will make it possible to provide location information by always using the accuracy parameter designated by a search object, and thereby ensure privacy protection.

Also, in the above embodiments, the location information conversion device 1 may accept designation of an upper limit on the accuracy parameter from a particular user or device in advance. In that case, if an accuracy parameter higher than this upper limit is designated, the location information conversion device 1 will refuse to process the location information output or will change the designated accuracy parameter to this upper limit before processing the location information. Consequently, any third party cannot acquire location information of an accuracy higher than the upper limit of the accuracy parameter designated by a search object, and thus it is possible to protect the privacy of the search object.

Figures 8, 9:
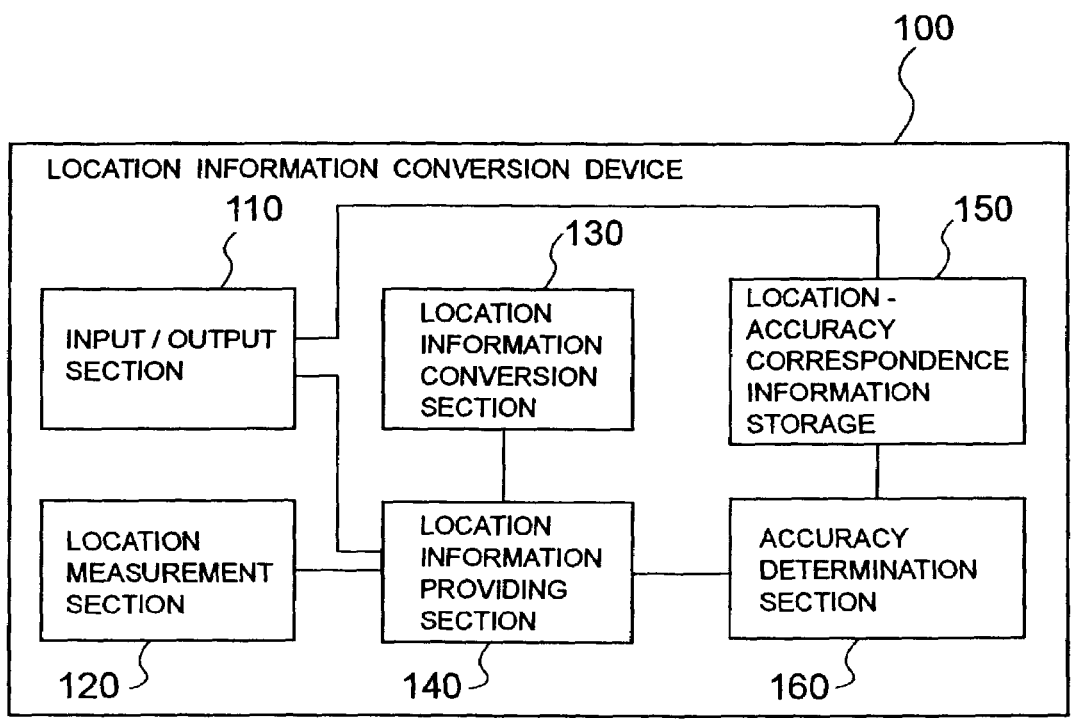
FIG. 8 is a block diagram showing configuration of a location information conversion device according to a third embodiment of the present invention.
FIG. 9 is a diagram showing an example of meanings represented by accuracy parameters according to the embodiment in FIG. 8.

FIG. 8 is a diagram showing configuration of a location information conversion device according to a third embodiment of the present invention. In the figure, the location information conversion device 100 consists of an input/output section 110 which inputs and outputs information from/to the outside, a location measurement section 120 which measures the location of a search object, a location information conversion section 130 which outputs input location information after converting it according to an accuracy represented by a designated accuracy parameter, a location information providing section 140 which provides the location information acquired by the location measurement section 120 and converted by the location information conversion section 130 to the outside, a location-accuracy correspondence information storage 150 which stores correspondence between location information and accuracy parameters, and an accuracy determination section 160 which determines an accuracy parameter for designated location information.

Now accuracy parameter values used and their meanings will be described. FIG. 9 shows an example of meanings represented by accuracy parameters in this embodiment. In FIG. 9, for example, if location information is expressed in latitude and longitude and the accuracy parameter is 1, the location information is expressed in latitude and longitude with an accuracy of 0.0001. FIG. 10 shows another example of meanings represented by accuracy parameters in this embodiment. In FIG. 10, for example, if location information is expressed by an address string and the accuracy parameter is 1, the location information is expressed by an address string accurate to a house number.

The location information conversion section 130 has a function of receiving location information and an accuracy parameter, convert the input location information into location information of the accuracy represented by the accuracy parameter, and output the resulting location information. Designatedally, if the accuracy parameters and meanings shown in FIG. 9 are used and if "N35.48532, E139.29624" and "4" are entered as location information in latitude/longitude and an accuracy parameter, respectively, the location information conversion section 130 outputs the location information "N35.4, E139.2" accurate to one decimal place by discarding the input location information below one decimal place.

Incidentally, although in the above conversion example, the location information conversion section 130 carries out the conversion by discarding values below 0.1, the method of conversion is not limited to this. Any conversion method may be used as long as location information of the accuracy represented by the accuracy parameter is produced by the conversion. For example, it is possible to employ a method which rounds values to the first decimal place. The method for expressing accuracy parameters as well as their meanings are defined for each location information conversion device 100. In the above examples, the accuracy parameters are expressed in natural numbers, but any method of expression may be used for accuracy parameters, including numeric values, character strings, and symbols.

Technologies which implement location measurement in the location measurement section 120 include GPS, methods employing a public network, and methods employing wireless tags and tag detectors as described above, but any method may be used as long as it can measure the location of a search object. Alternatively, location measurement may be implemented by a setup in which the location measurement section 120 acquires location information by communicating with a location measurement device provided outside the location information conversion device 100. Also, location measurement may be implemented by a setup in which the location measurement section 120 acquires the latest location information stored in a location measurement device provided outside the location information conversion device 100 to measure and record the locations of search objects periodically.

The location-accuracy correspondence information storage 150 manages correspondence between location information and accuracy parameters. FIG. 11 shows an example of data stored in the location-accuracy correspondence information storage 150 according to this embodiment. In the figure, the location-accuracy correspondence information storage 150 manages combinations of an area containing sets of locations and an accuracy parameter. The accuracy parameter corresponding to location information which represents points contained in each area constitutes an accuracy parameter which corresponds to that area. Designatedly, an area/accuracy parameter combination "(N35.48 to N35.49, E139.27 to E139.28): 3" means that the accuracy parameter corresponding to the location information which represents the points contained in a rectangular area extending from 35.48 to 35.49 degrees north latitude and from 139.27 to 139.28 degrees east longitude is "3." This information makes it possible to reference accuracy parameters which correspond to locations.

FIG. 12 shows another example of data stored in the location-accuracy correspondence information storage 150 according to this embodiment. In the figure, the location-accuracy correspondence information storage 150 manages the correspondence between an area represented by an address and an accuracy parameter for location information which represents points contained in the area. For example, an area/accuracy parameter combination "Miyamae Ward, Kawasaki City, Kanagawa Prefecture: 2" means that the accuracy parameter corresponding to the location information which represents the points contained in the area Miyamae Ward, Kawasaki City, Kanagawa Prefecture is "2."

Two examples of data stored in the location-accuracy correspondence information storage 150 have been cited above. However, it is possible to employ any method for expressing or storing information in the location-accuracy correspondence information storage 150 as long as an accuracy parameter can be determined uniquely for any location information in the areas covered by the location-accuracy correspondence information storage 150. For example, although in the above example, the location-accuracy correspondence information storage 150 stores the correspondence between areas and accuracy parameters, it may store correspondence between individual pieces of location information and accuracy parameters.

Furthermore, although the correspondence between areas and accuracy parameters or correspondence between location information and accuracy parameters stored in the location-accuracy correspondence information storage 150 are preset by a search subject via the input/output section 110 before a search request for location information, it may be designed to allow a search subject to make dynamic changes via the input/output section 110 during the use of the location information conversion device 100.

Incidentally, settings or changes to the correspondence between areas and accuracy parameters or correspondence between location information and accuracy parameters may be made by someone other than the manager of the location information conversion device such as the search subject. The accuracy determination section 160 has a function to accept input of location information and output an accuracy parameter for the input location information with reference to the location-accuracy correspondence information storage 150.

Figure 13:
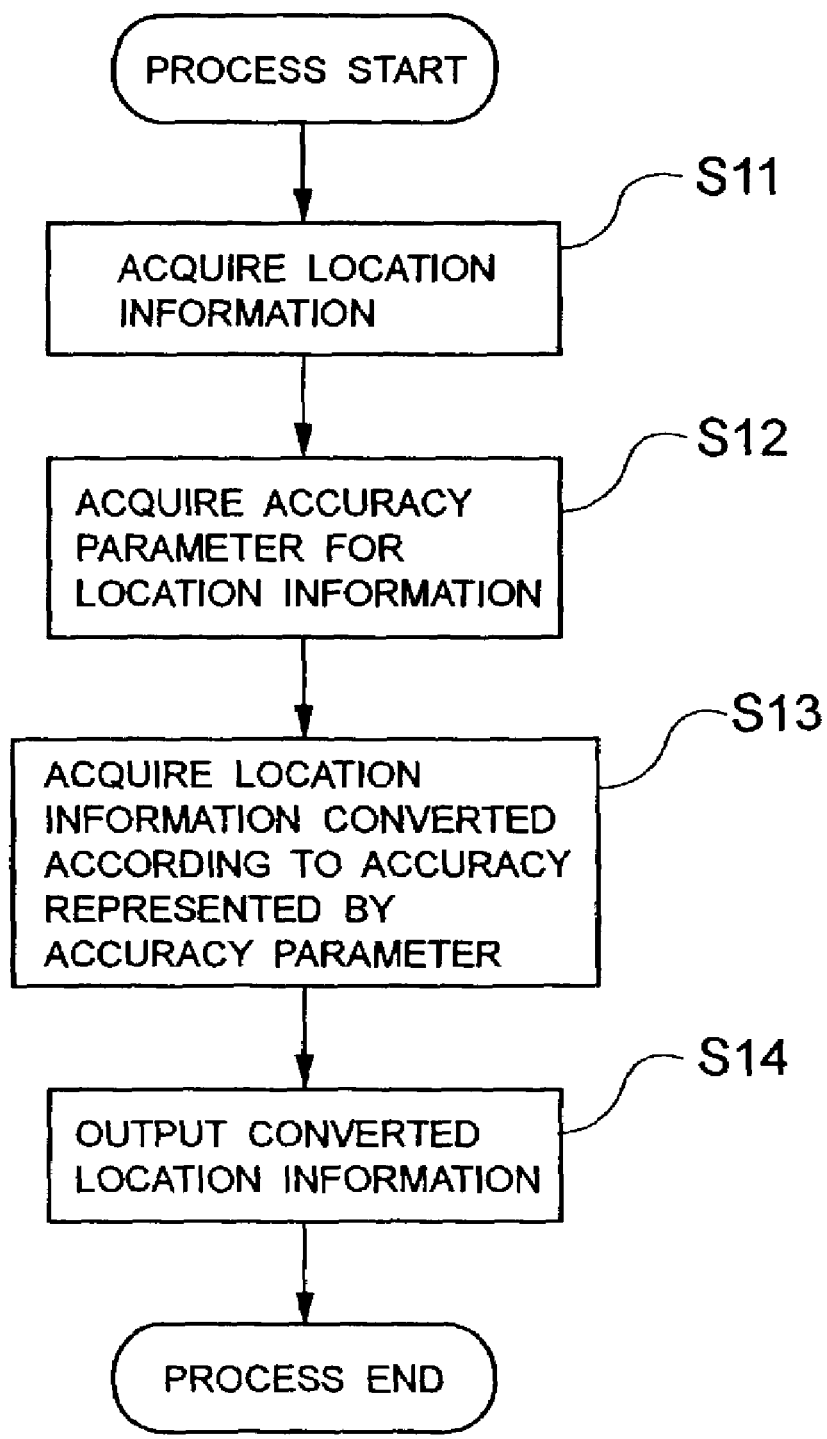
FIG. 13 is a flowchart showing operations performed by a location information providing section when the location information conversion device according to the embodiment in FIG. 8 provides location information.

Next, operation of the location information conversion device according to this embodiment will be described in detail. FIG. 13 is a flowchart showing operations performed by the location information providing section 140 when the location information conversion device 100 provides location information. It is assumed that information in the location-accuracy correspondence information storage 150 has been preset by the search subject. Upon receiving a request for location information from the outside via the input/output section 110, the location information conversion device 100 starts processing.

In Step S11 (hereinafter, the term "Step" before step numbers will be omitted), the location information providing section 140 makes the location measurement section 120 acquire location information about a measuring object. Then, in S12, the location information providing section 140 inputs the acquired location information into the accuracy determination section 160 and acquires the accuracy parameter for this location information which has been output by the accuracy determination section 160 with reference to the location-accuracy correspondence information storage 150.

Next, in S13, the location information providing section 140 inputs the acquired location information and accuracy parameter into the location information conversion section 130 and acquires the location information converted by the location information conversion section 130 according to the accuracy parameter. Finally, in S14, the location information providing section 140 outputs the converted location information acquired from the location information conversion section 130 to the requesting party via the input/output section 110. By means of the above processes, the location information conversion device 100 can convert the location information about the search object according to the accuracy which corresponds to the location of the search object.

Incidentally, it is obvious that the processing operations shown in FIG. 13 may be performed by storing them as a program in a recording medium in advance and executing the program on a computer. It goes without saying that this also applies to the processing operations shown earlier in FIGS. 3 and 6.

Figure 14:
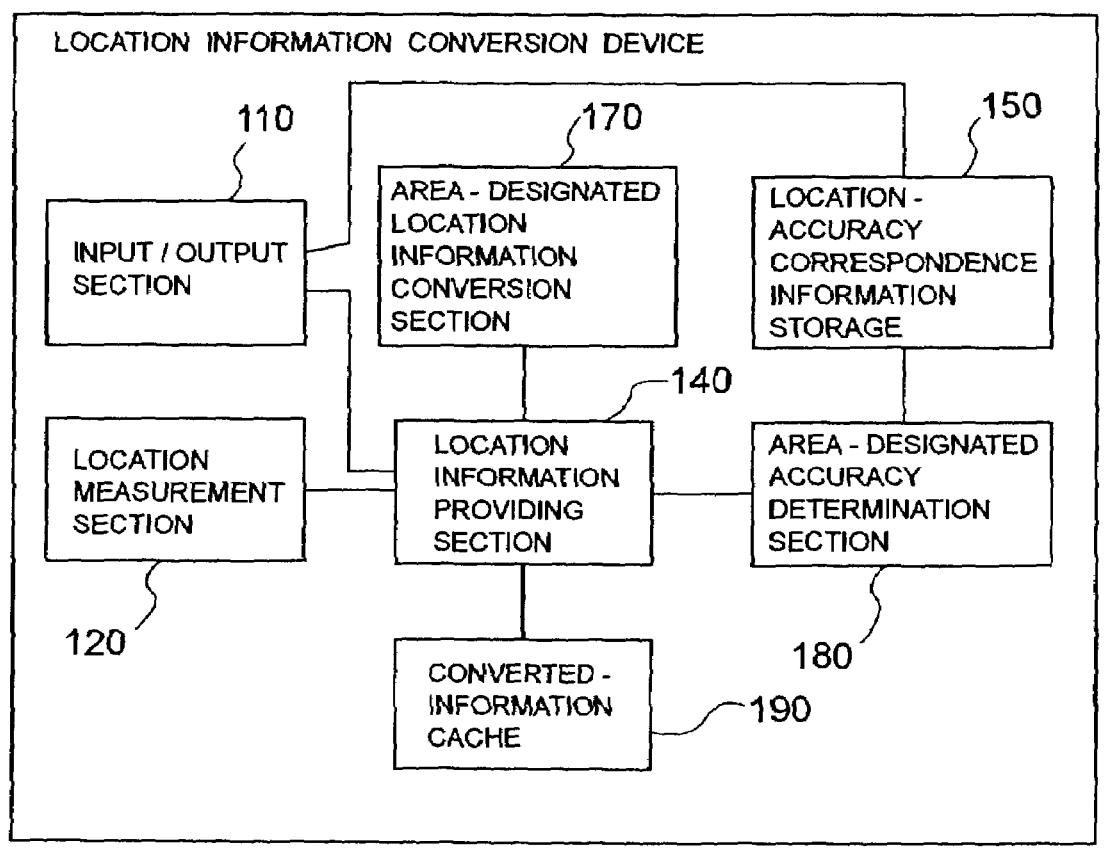
FIG. 14 is a block diagram showing configuration of a location information conversion device according to a fourth embodiment of the present invention.

Next, a fourth embodiment of the present invention will be described. FIG. 14 is a diagram showing configuration of a location information conversion device according to this embodiment. In the figure, the location information conversion device 101 according to this embodiment consists of an area-designated location information conversion section 170 which accepts input of retrieved first location information, first area information, and accuracy parameter and outputs second location information and second area information; an area-designated accuracy determination section 180 which accepts input of the first location information, outputs an accuracy parameter corresponding to the first location information by acquiring it from the location-accuracy correspondence information storage 150, and outputs first area information; and a converted-information cache 190 which manages cached information about past conversion processes of location information. Besides, components equivalent to components in FIG. 8 are denoted by the corresponding reference numerals. Incidentally, the first area information, second area information, and second location information will be described later.

Upon receiving retrieved first location information, the area-designated accuracy determination section 180 functions to acquire accuracy parameter for the first location information with reference to the location-accuracy correspondence information storage 150 and output first area information about an area that surrounds and includes the location defined by the first location information and consists of a set of points which correspond to the same accuracy parameter as that for the first location information.

Figures 15, 16:
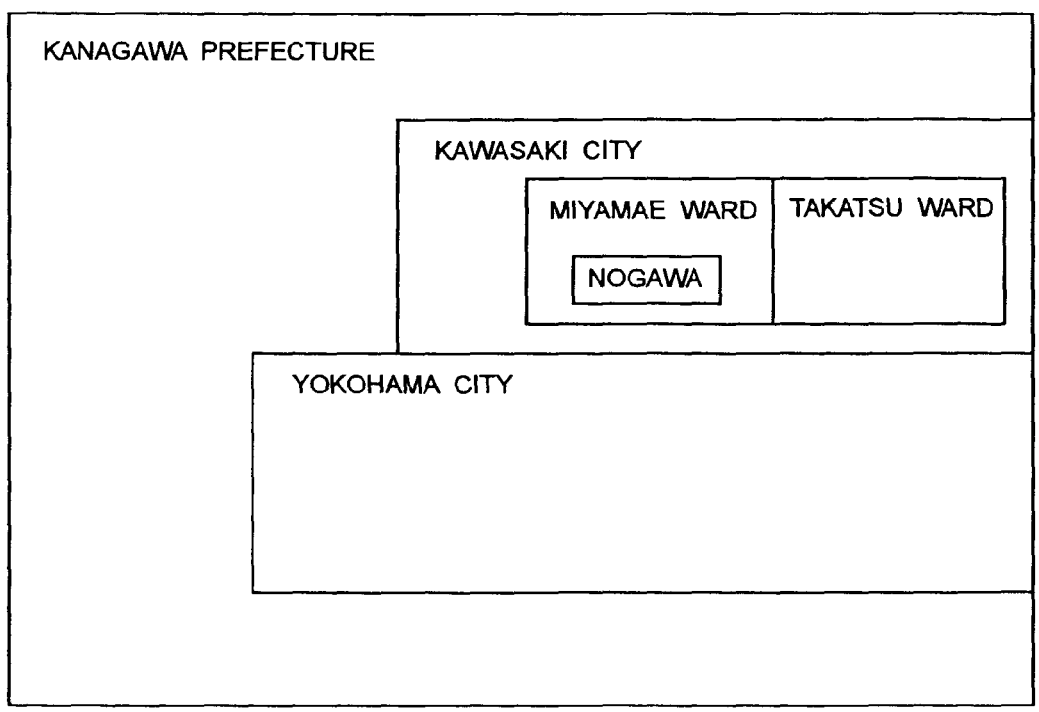
FIG. 15 is a diagram showing a geographical concept of location information according to the embodiment in FIG. 14.
FIG. 16 is a diagram showing an example of data stored in a location-accuracy correspondence information storage according to the embodiment in FIG. 14.

Now this will be explained by citing a concrete example. It is assumed that location information is represented in address character strings and the location-accuracy correspondence information storage 150 stores the data shown in FIG. 16 and that accuracy parameters have the meanings shown in FIG. 10. A geographical conceptual diagram of the area shown in FIG. 16 is provided in FIG. 15. In FIG. 15, Kanagawa Prefecture include Kawasaki City and Yokohama City adjacent to each other, Kawasaki City includes Miyamae Ward and Takatsu Ward, and Miyamae Ward includes a place named Nogawa.

Suppose the input first location information is "4-1-1 Miyazaki, Miyamae Ward, Kawasaki City, Kanagawa Prefecture" (hereinafter abbreviated to "P"). Referring to FIG. 16, P falls under "Kawasaki City excluding Nogawa, Miyamae Ward," so the appropriate accuracy parameter is "3." Thus, the area-designated accuracy determination section 180 acquires the accuracy parameter "3" with reference to the location-accuracy correspondence information storage 150.

Thus, the area-designated accuracy determination section 180 outputs first area information about an area "Miyazaki, Miyamae Ward, Kawasaki City" or "Miyamae Ward, Kawasaki City (excluding Nogawa)" that surrounds and includes P defined by the first location information and consists of a set of points which correspond to the same accuracy parameter "3" as that for P defined by the first location information. In short, it outputs the "entire area of Kawasaki City excluding Nogawa, Miyamae Ward" as the first area information.

Now, It is assumed that location information is expressed in latitude and longitude, that the location-accuracy correspondence information storage 150 stores the data shown in FIG. 11, and that accuracy parameters have the meanings shown in FIG. 9. Incidentally, part of the relationship between the areas and accuracy parameters shown in FIG. 11 are tabulated in FIG. 17.

Now, suppose the input first location information is "N35.485, E139.274" (hereinafter abbreviated to "Q"). In this case, Q falls under "(N35.48 to N35.49, E139.27 to E139.28)," so the appropriate accuracy parameter is "3." Thus, the area-designated accuracy determination section 180 acquires the accuracy parameter "3" with reference to the location-accuracy correspondence information storage 150.

Figure 17:
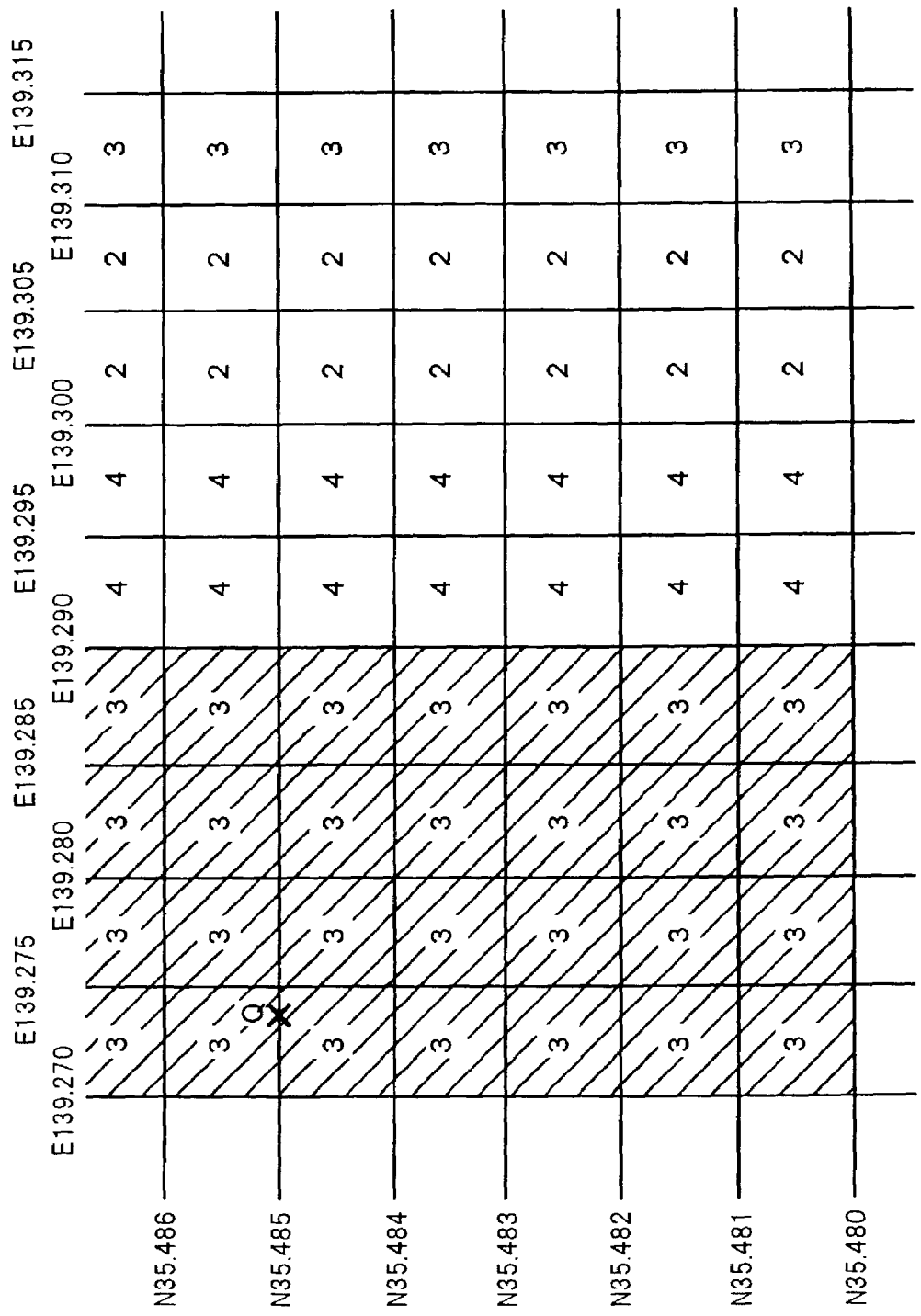
FIG. 17 is a diagram showing relationship between areas expressed in latitude/longitude and accuracy parameters.

In FIG. 17, the area-designated accuracy determination section 180 outputs first area information about an area that surrounds and includes Q defined by the first location information and consists of a set of points which correspond to the same accuracy parameter "3" as that for P defined by the first location information. In short, it outputs "(N35.480 to N35.490, E139.270 to E139.290)" (shaded area in FIG. 17) as the first area information.

Incidentally, depending on the format of information stored in the location-accuracy correspondence information storage 150, the area-designated accuracy determination section 180 cannot output first location information. For example, cases are when the location-accuracy correspondence information storage 150 stores correspondence between location information about points and accuracy parameters instead of correspondence between areas and accuracy parameters such as the one shown in FIG. 11 or 12 or when the location-accuracy correspondence information storage 150 stores a mixture of correspondence between areas and accuracy parameters and correspondence between location information about points and accuracy parameters. In such cases, around the location defined by input location information, there may not exist an area which has the same accuracy parameter as that for the location information (points). In that case, the area-designated accuracy determination section 180 outputs an area consisting only of the points which compose the location defined by the input first location information, as first location information.

The area-designated location information conversion section 170 accepts input of first location information, first area information, and an accuracy parameter and converts the input first location information into second location information according to the accuracy represented by the designated accuracy parameter. Then, it produces second area information about an area consisting of a set of points which are located in the area defined by the first area information and which coincide with the points defined by the second location information after a conversion using the accuracy represented by the designated accuracy parameter. Then, it outputs the second location information and second area information.

This will be explained using a concrete example cited above. First, the area-designated location information conversion section 170 receives "4-1-1 Miyazaki, Miyamae Ward, Kawasaki City (P)," "entire area of Kawasaki City excluding Nogawa, Miyamae Ward, Kawasaki City," and "3" as the first location information, first area information, and accuracy parameter, respectively. It converts the input first location information "P" into a "ward name" according to the accuracy represented by the designated accuracy parameter "3" to obtain "Miyamae Ward, Kawasaki City" as the second location information.

Then, it produces second area information "Miyamae Ward, Kawasaki City excluding Nogawa" about a set of points which are located in the "entire area of Kawasaki City excluding Nogawa, Miyamae Ward, Kawasaki City" defined by the first area information and which coincide with the points defined by second location information "Miyamae Ward, Kawasaki City" after a conversion based on the designated accuracy parameter "3: Ward name." Then, it outputs "Miyamae Ward, Kawasaki City" and "Miyamae Ward, Kawasaki City excluding Nogawa" as the second location information and second area information, respectively. This means that any part of the input first location information that is included in the second area information "Miyamae Ward, Kawasaki City excluding Nogawa" is converted by the area-designated location information conversion section 170 into the second location information represented by "Miyamae Ward, Kawasaki City."

As another example, description will be given about a case in which the location-accuracy correspondence information storage 150 stores the data shown in FIG. 11, accuracy parameters have the meanings shown in FIG. 9, and the area-designated location information conversion section 170 discards any value lower than the accuracy represented by a designated accuracy parameter. The area-designated location information conversion section 170 receives "(N35.485, E139.274) (Q)," "(N35.480 to N35.490, E139.270 to E139.290)," and "3" as the first location information, first area information, and accuracy parameter, respectively. It converts the accuracy of the input first location information "Q" into the accuracy represented by accuracy parameter "3," i.e., into accuracy on the order of 0.01 to obtain "(N35.48, E139.27)" as the second location information.

Then, it produces second area information "(N35.48 to N35.49, E139.27 to E139.28) (showing a value less than F139.28 but not including E139.28)", about a set of points which are located in "(N35.480 to N35.490, E139.270 to E139.290)" defined by the first area information and which coincide with the points defined by second location information "(N35.48, E139.27)" after a conversion based on the designated accuracy parameter "3: 0.01". Then, it outputs "(N35.48, E139.27)" and "(N35.48 to N35.49, E139.27 to E139.28)" as the second location information and second area information, respectively. This means that any part of the input first location information that is included in the second area information "(N35.48 to N35.49, E139.27 to E139.28)" is converted by the area-designated location information conversion section 170 into the second location information represented by "(N35.48, E139.27)."

In the converted-information cache 190, a combination of the second area information and second location information output by the area-designated location information conversion section 170 is stored as cached information. FIG. 18 shows an example of information data cached in the converted-information cache 190 shown in FIG. 14. As showm in FIG. 18, a combination of the second area information "(N35.48 to N35.49, E139.27 to E139.28)" and second location information "(N35.48, E139.27)" is stored as cached information. This cached information means that any part of the input first location information that is included in the second area information "(N35.48 to N35.49, E139.27 to E139.28)" is converted by the area-designated location information conversion section 170 into the second location information "(N35.48, E139.27)."

Thus, if input first location information is included in the second area information, the location information providing section 140 can convert location information simply by referencing the converted-information cache 190 without using the area-designated accuracy determination section 180 or area-designated location information conversion section 170. In such a case, the converted-information cache 190 may contain two or more sets of cached information. It is also possible to place an upper limit on the number of sets of cached information stored in the converted-information cache 190.

Figure 19:
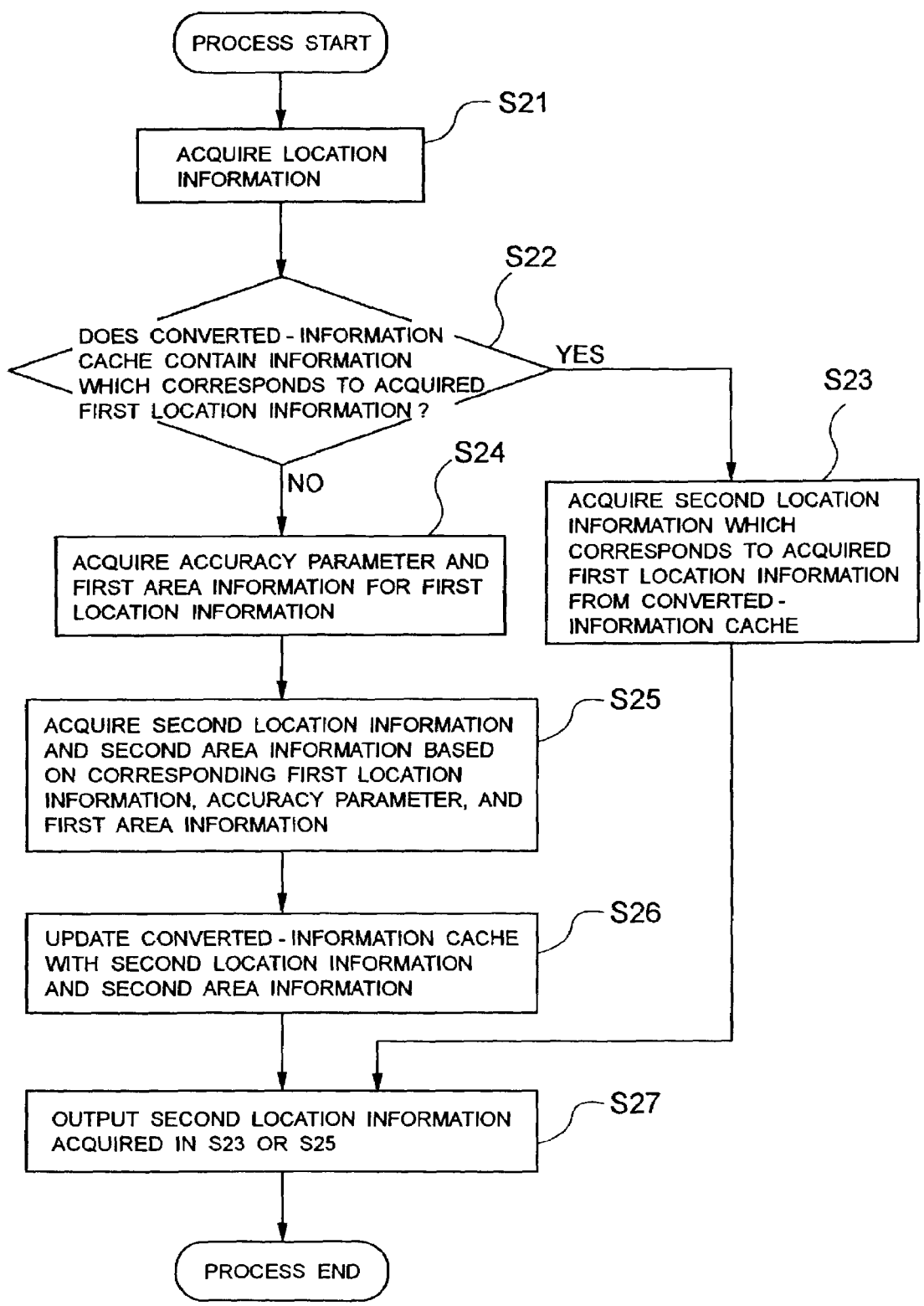
FIG. 19 is a flowchart showing operations performed by a location information providing section when the location information conversion device according to the embodiment in FIG. 14 provides location information.

Next, operation of the location information conversion device according to this embodiment will be described in detail. FIG. 19 is a flowchart showing operations performed by the location information providing section 140 when the location information conversion device 100 provides location information. It is assumed that information in the location-accuracy correspondence information storage 150 has been preset by the search subject. Upon receiving a request for location information from the outside via the input/output section 110, the location information conversion device 100 starts processing.

In S21, the location information providing section 140 makes the location measurement section 120 acquire first location information about a measuring object. Then, in S22, the location information providing section 140 judges with reference to the converted-information cache 190 whether the information cached in the converted-information cache 190 contains area information which corresponds to the first location information acquired by the location measurement section 120.

If it is judged in S22 that area information which corresponds to the acquired first location information is stored in the converted-information cache 190 (S22: YES), the location information providing section 140 goes to S23, in which it acquires second location information about an area which includes the area defined by the first location information from the information stored in the converted-information cache 190. Then it goes to S27.

If it is judged in S22 that area information which corresponds to the acquired first location information is not stored in the converted-information cache 190 (S22: NO), the location information providing section 140 goes to S24, where it inputs the acquired first location information into the area-designated accuracy determination section 180 and acquires the accuracy parameter and first area information output by the area-designated accuracy determination section 180 for the first location information with reference to the location-accuracy correspondence information storage 150.

Next, in S25, the location information providing section 140 inputs the acquired first location information, accuracy parameter, and first area information into the area-designated location information conversion section 170 and acquires corresponding second location information and second area information. Then, in S26, the location information providing section 140 adds the second location information and second area information acquired from the area-designated location information conversion section 170 to the converted-information cache 190 and updates the information stored in the converted-information cache 190.

Finally, in S27, the location information providing section 140 outputs the location information acquired from the converted-information cache 190 or second location information acquired from the area-designated location information conversion section 170 to the requesting party via the input/output section 110. By means of the above processes, the location information conversion device 100 can provide the location information about the search object according to the accuracy which corresponds to the location of the search object. Also, it can provide location information quickly in a simple manner if the location information has been retrieved and converted once in the past.

Incidentally, it is obvious that the processing operations shown in FIG. 19 may be performed by storing them as a program in a recording medium in advance and executing the program on a computer.

As described above, according to this embodiment, by caching information about past conversion results of location information in the converted-information cache 190, it is possible to convert location information quickly in a simple manner with reference to the converted-information cache 190 without performing calculations to determine an accuracy or convert the location information if location information about the given location or neighboring locations has been converted once in the past. This improves the efficiency of conversion processes when location information is converted successively in a certain period of time because a search object does not usually move great distances in a limited period of time.

Incidentally, in the above embodiments, the data stored in the location-accuracy correspondence information storage 150 is changed by being preset by a search subject before a search request for location information or by being set dynamically by the search subject during the use of the location information conversion device 100. Each time the data is changed, the information cached in the converted-information cache 190 is erased.

In other words, since the information stored in the converted-information cache 190 is based on the information stored in the location-accuracy correspondence information storage 150, it becomes invalid when the information stored in the location-accuracy correspondence information storage 150 is updated or changed. Alternatively, it is possible to erase only that part of the information stored in the converted-information cache 190 which corresponds to changed data in the location-accuracy correspondence information storage 150.

Incidentally, in the third and fourth embodiments described above, it is assumed that one kind of data is stored in the location-accuracy correspondence information storage 150. However, it is possible to provide two or more types of information and use them selectively according to the person who request location information, time when location information is requested, and desires of a search subject.

For example, the accuracy of location information may be changed by adding a time parameter to a combination of an area and accuracy parameter and varying the accuracy parameter with the time period in which location information is requested. FIGS. 20A to 20C show relationships between time periods in which location information is requested and accuracy parameters. Also, combinations of areas and the patterns shown in FIG. 20 are presented in FIG. 21.

Suppose accuracy parameters have the meanings shown in FIG. 10 and "4-1-1 Miyazaki, Miyamae Ward, Kawasaki City (P)" described above is input as location information at 10 o'clock. It can be seen from FIG. 21 that "Miyamae Ward, Kawasaki City" follows Pattern C, and thus FIG. 20C is referenced. Since the accuracy parameter at that time is "1," the location information is converted using "1: House number" in FIG. 10. Consequently, it is converted into location information "4-1-1 Miyazaki, Miyamae Ward, Kawasaki City." In this way, it is possible to convert location information using the accuracy which is based on the location defined by the location information about a search object and the time period in which the location information is searched for.

Furthermore, in the embodiments described above, the location information conversion device 100 or 101 (or the location information conversion device 1 in FIG. 1 or 5, the same applies hereinafter) may exist in the portable terminal carried by the search object or may exist independently of the search object, for example, in a computer or server (information processing unit) connected with the portable terminal via a network.

Figure 22:
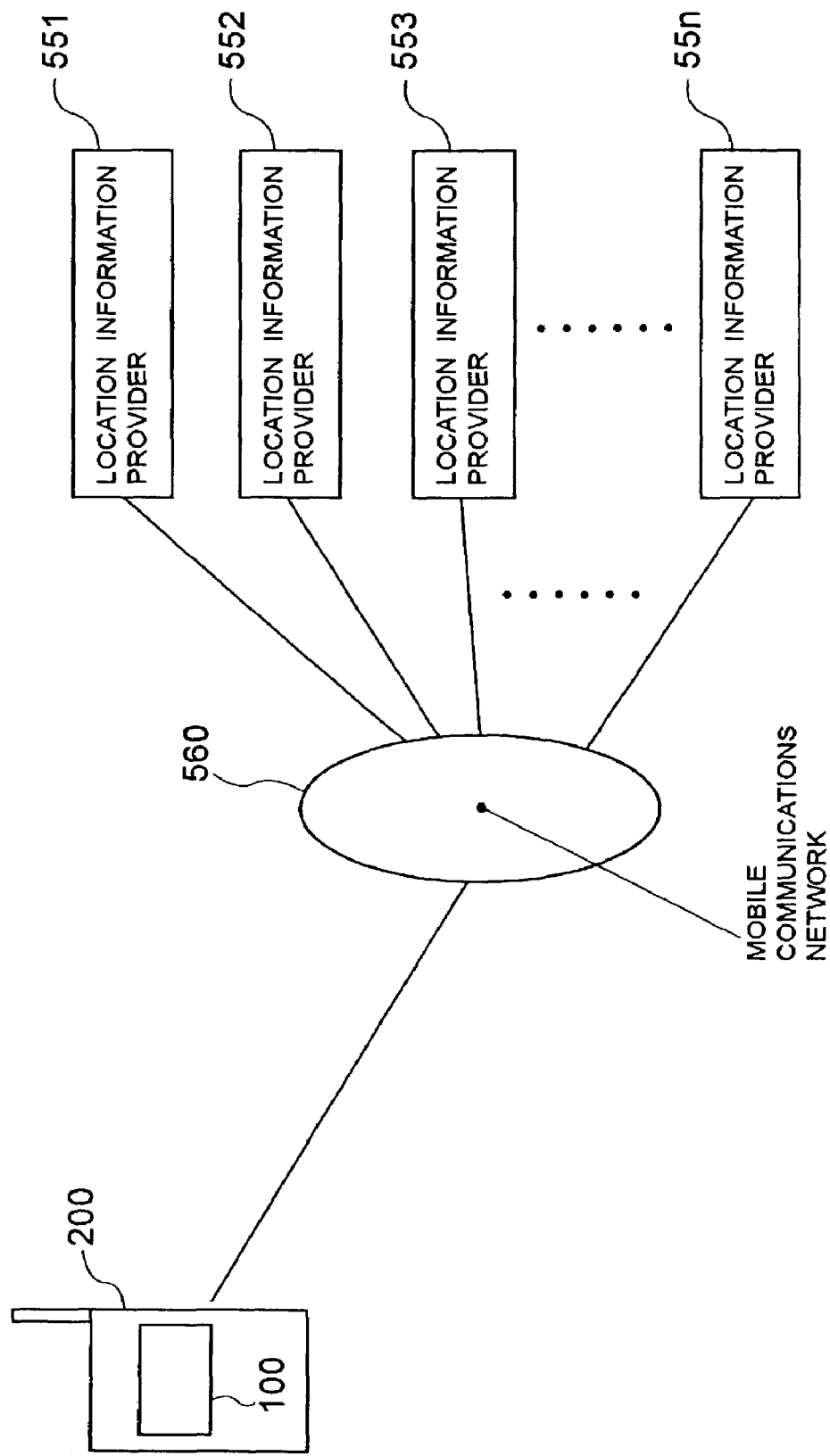
FIG. 22 is a diagram showing configuration of a location information providing system according to an embodiment of the present invention.
Figure 23:
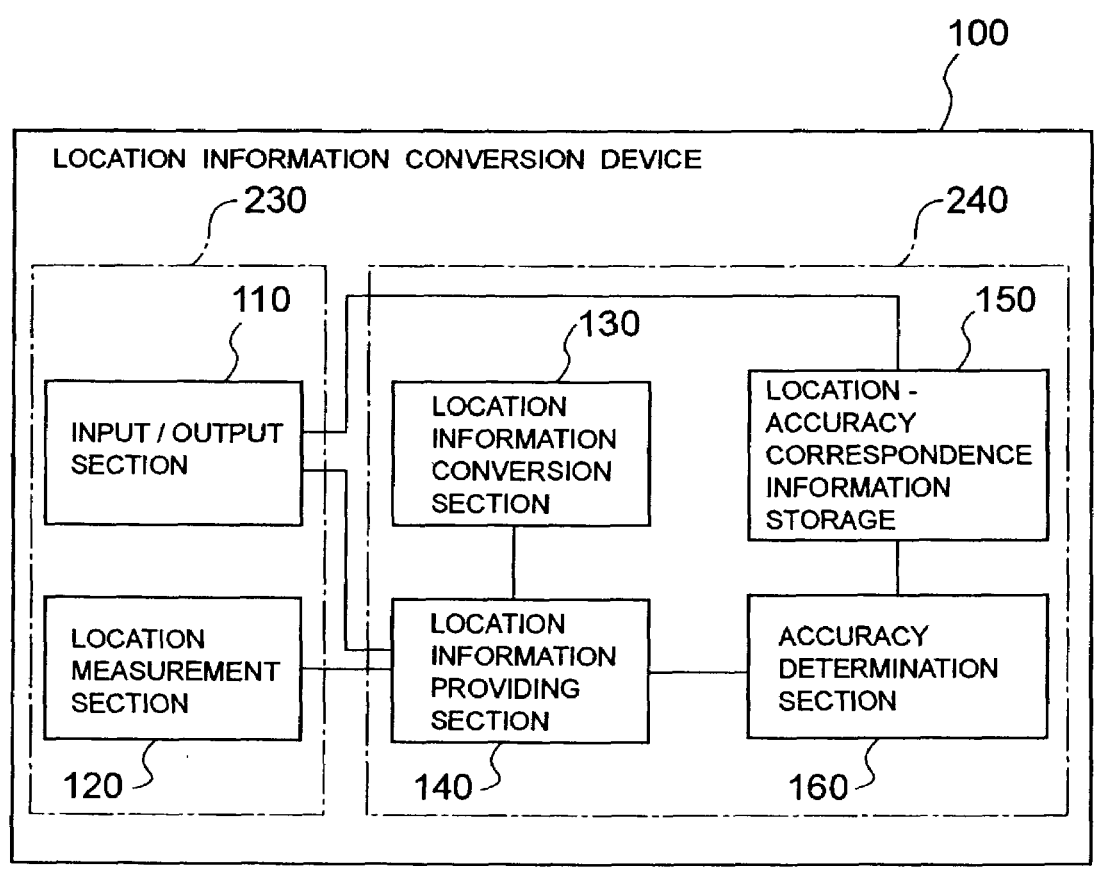
FIG. 23 is a diagram showing an example of various sections in the internal configuration of a location information providing device according to an embodiment of the present invention.
Figure 24:
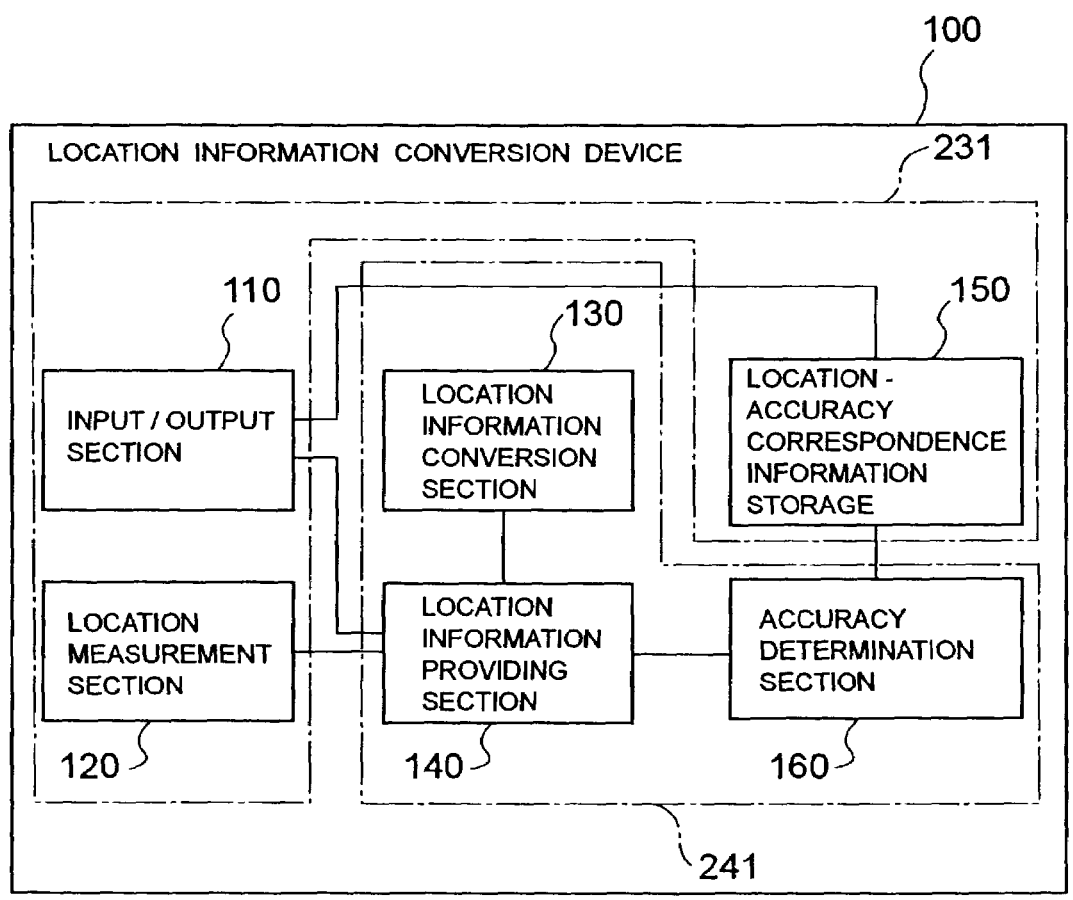
FIG. 24 is a diagram showing another example of various sections in the internal configuration of a location information providing device according to an embodiment of the present invention.

Concrete configurations are shown in FIGS. 22 to 25, each of which shows a configuration in which the location information conversion device 100 according to an embodiment of the present invention is applied to a location information providing system. In FIGS. 22 to 25, reference numeral 200 denotes a portable terminal. Components equivalent to components in FIG. 26 are denoted by the corresponding reference numerals. Besides, FIGS. 23 and 24 show examples of various sections in the internal configuration of the location information conversion device 100 according to the above embodiments.

Designatedly, FIG. 22 shows a case in which the portable terminal 200 contains the entire location information conversion device 100. In such a configuration, the location information retrieved by the portable terminal 200 has its accuracy converted appropriately in the portable terminal 200 before it is provided to the location-related information providers 551, 552, 553, . . . , 55n via the mobile communications network 560, ensuring privacy protection of the portable terminal 200 user in terms of his/her location.

Figure 25:
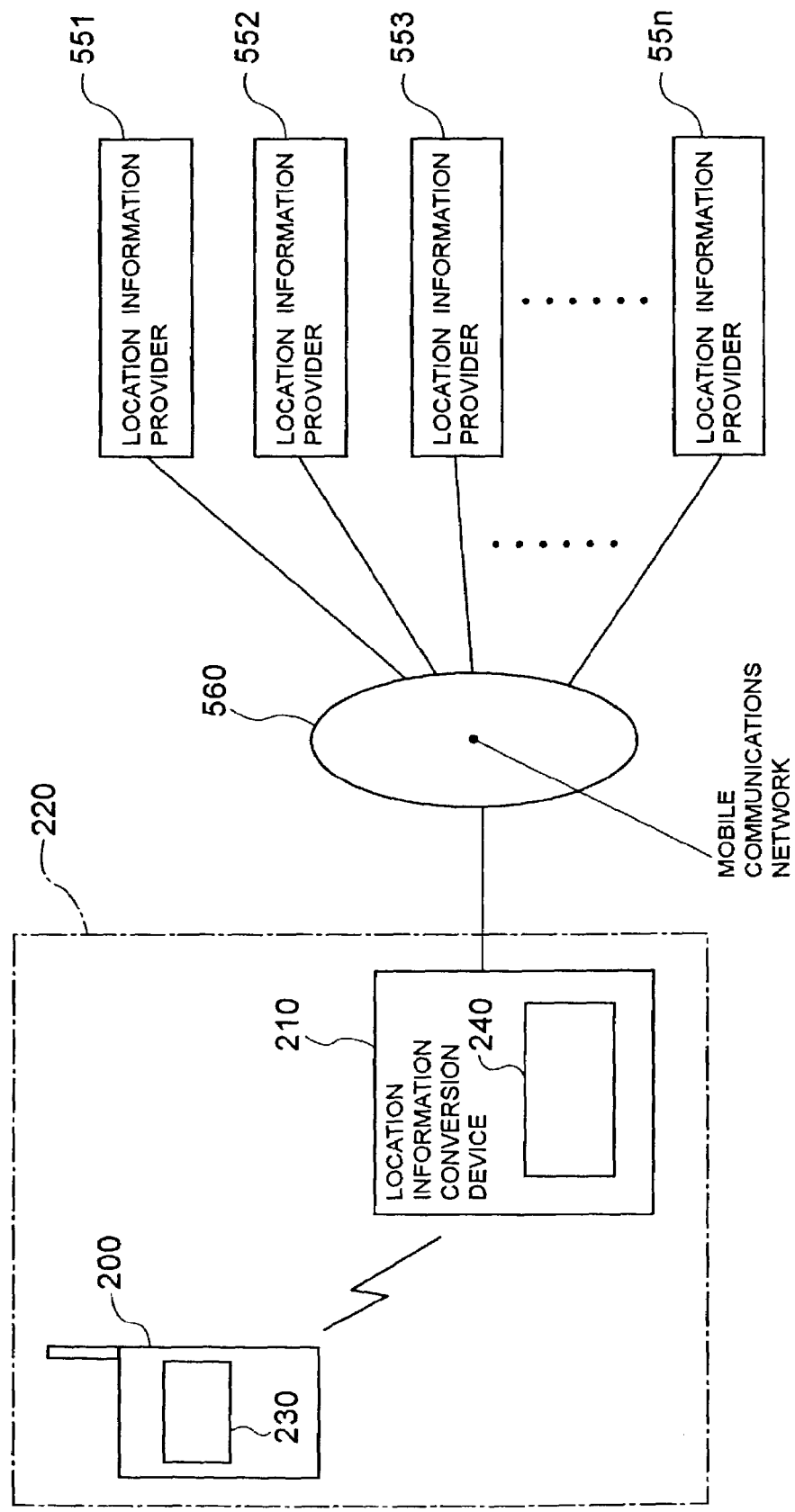
FIG. 25 is a diagram showing an example in which internal configuration of a location information conversion device is divided and laid out in a location information providing system according to an embodiment of the present invention.
Figure 26:
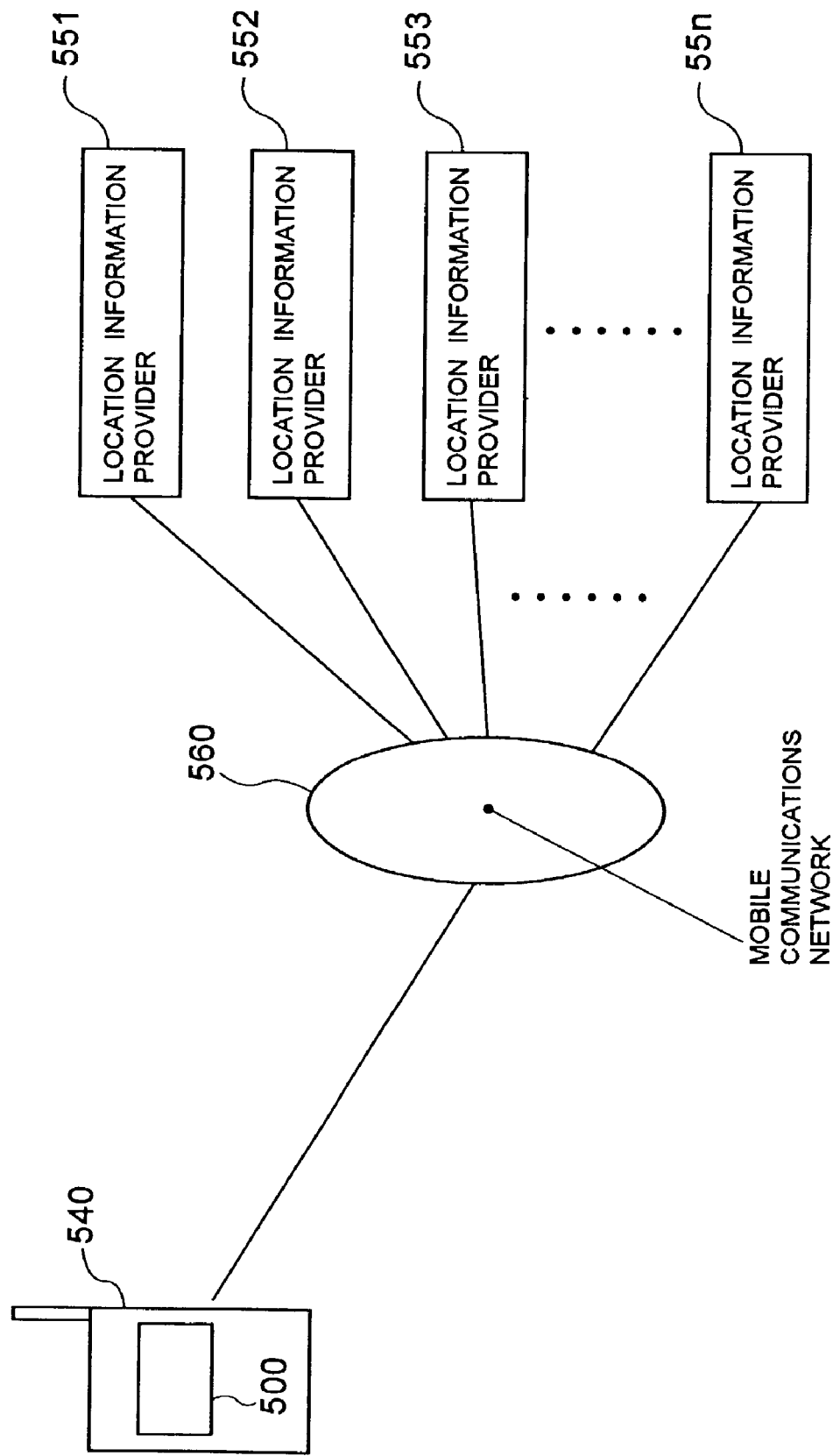
FIG. 26 is a diagram showing configuration of a conventional location information providing system.
Figure 27:
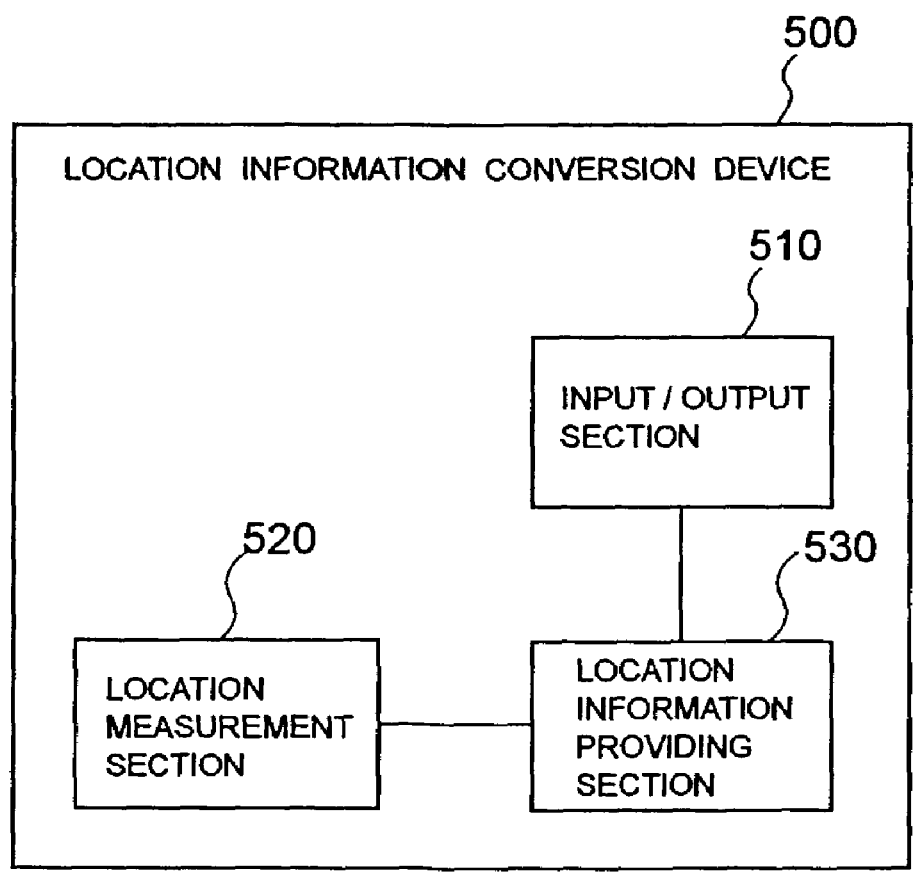
FIG. 27 is a block diagram showing configuration of a conventional location information conversion device.

FIG. 25 shows a configuration in which, out of the location information conversion device 100 shown in FIG. 23, part 230 consisting of the input/output section 100 and location measurement section 120 is installed in the portable terminal 200 while the remaining part 240 is provided in a location information conversion device 210 connected with the portable terminal 200.

A location information conversion system 220 which combines the portable terminal 200 and location information conversion device 210 allows the location information retrieved by the portable terminal 200 to be converted into location information of a predetermined accuracy in the location information conversion device 210 before it is provided to the location-related information providers 551, 552, 553, . . . , 55n via the mobile communications network 560. This ensures privacy protection of the user in terms of his/her location from the location-related information providers 551, 552, 553, . . . , 55n. Incidentally, the location information conversion device 210 may be a home computer or server (information processing unit). Moreover, it may be a server of a reliable common carrier with which the user is under contract.

Furthermore, as shown in FIG. 24, it is also possible to configure the location information conversion system 220 by installing a part 231 of the location information conversion device 100 which consists of the input/output section 110, location measurement section 120, and location-accuracy correspondence information storage 150 in the portable terminal 200 and installing the remaining part 241 in the location information conversion device 210. This configuration will make it possible to construct the location information providing system shown in FIG. 25, which will ensure privacy protection of the portable terminal 200 user in terms of his/her location. Incidentally, the location information conversion device 101 described above may also be applied to the location information providing systems shown in FIGS. 22 and 25.

Also, the location-accuracy correspondence information storage 150 shown in FIGS. 23 and 24 may be installed in the portable terminal 200 shown in FIG. 22 or 25. This will allow the user of the portable terminal 200 to change individual settings of storage contents freely, resulting in reduced loads and storage capacity on the part of the server.

As described above, the present invention provides a location information conversion device which can provide location information of an accuracy equal to or lower than a designated accuracy, thereby ensuring privacy protection of an object.

Also, by associating location information and an accuracy parameter and converting the location information according to the accuracy represented by the accuracy parameter, the present invention can provide the location information to location-related information providers after converting it according to the,accuracy appropriate for the location of a search object. Thus, it is effective in ensuring privacy protection of a search subject in terms of his/her location as well as providing location-related information of different accuracies according to the location information.

Furthermore, by providing means for storing converted-location information which has been converted in the past, the present invention can convert location information quickly in a simple manner without performing calculations to determine an accuracy or convert the location information if location information about the given location or neighboring locations has been converted once in the past. Especially when converting location information successively in a certain period of time, the present invention has the effect of further improving the efficiency of conversion processes because a search object does not usually move great distances in a limited period of time.

What is claimed is:

1. A location information conversion device, comprising location information conversion means for decreasing the accuracy of input location information to an accuracy equal to or lower than a pre-designated accuracy, and for outputting the converted location information.

2. The location information conversion device according to claim 1, further comprising location measurement means for acquiring said input location information.

3. The location information conversion device according to claim 1, wherein said location information conversion means acquires a designation for said accuracy at the same time as a request for location information is received.

4. The location information conversion device according to claim 1, wherein said location information conversion means acquires a designation for said accuracy with reference to preregistered internal information.

5. The location information conversion device according to claim 1, wherein an upper limit is placed on the pre-designated accuracy.

6. The location information conversion device according to claim 5, wherein the upper limit of said accuracy can be designated.

7. A location information providing system comprising the location information conversion device according to claim 1, a location-related information providing device for providing location-related information related to said input location information based on location information outputted from said location information conversion device, and a communications network for connecting said location information conversion device and said location-related information providing device.

8. The location information conversion device according to claim 1, wherein said location information conversion means decreases the accuracy of said input location information to an accuracy according to the location.

9. The location information conversion device according to claim 8, wherein said location information conversion means comprises:
a location-accuracy correspondence information storage for storing correspondence between location information and a target accuracy;
an accuracy determination section for outputting an accuracy for said input location information with reference to the stored correspondence information; and
a location information conversion section for decreasing the accuracy of said input location information to the accuracy output from said accuracy determination section and for outputting the converted input location information.

10. The location information conversion device according to claim 9, further comprising an input/output section for changing or setting said correspondence.

11. The location information conversion device according to claim 10, wherein:
said location information conversion means comprises a location measurement section for acquiring said input location information,
said input/output section and said location measurement section are installed in a portable terminal, and the rest is installed in an information processing unit which can communicate with the portable terminal.

12. The location information conversion device according to claim 10, wherein:
said location information conversion means comprises a location measurement section for acquiring said input location information,
said input/output section, said location measurement section, and said location-accuracy correspondence information storage are installed in a portable terminal, and the rest is installed in an information processing unit which can communicate with the portable terminal.

13. The location information conversion device according to claim 8, wherein said location information conversion means comprises a location measurement section for acquiring said input location information.

14. The location information conversion device according to claim 8, wherein said location information conversion means is installed in a portable terminal.

15. The location information conversion device according to claim 1, wherein said location information conversion means comprises area-designated location information conversion means for decreasing the accuracy of said input location information to an accuracy designated in relation to area information about an area which includes the location, and for outputting the converted location information.

16. The location information conversion device according to claim 15, wherein said area-designated location information conversion means comprises a location measurement section for acquiring said first location information.

17. The location information conversion device according to claim 15, wherein said area-designated location information conversion means is installed in a portable terminal.

18. A location information conversion device comprising location information conversion means for decreasing the accuracy of input location information to an accuracy equal to or lower than a pre-designated accuracy in a pre-designated first unit system, and for outputting the converted location information.

19. The location information conversion device according to claim 18, wherein said location information conversion means comprises unit system conversion means for converting said input location information into location information in the first unit system, and accuracy adjustment means for decreasing the accuracy of said input location information to an accuracy equal to or lower than said pre-designated accuracy.

20. The location information conversion device according to claim 19, wherein said location information conversion means further comprises means for converting the location information whose accuracy has been decreased by said accuracy adjustment means, into location information in a pre-designated second unit system, and for outputting the resulting location information.

21. A location information conversion method comprising decreasing the accuracy of input location information to an accuracy equal to or lower than a pre-designated accuracy, and outputting the location information with the decreased accuracy.

22. The location information conversion method according to claim 21, further comprising acquiring said location information.

23. The location information conversion method according to claim 21, wherein decreasing the accuracy of said location information comprises acquiring a designation for said accuracy at the same time as a request for location information is received.

24. The location information conversion method according to claim 21, wherein decreasing the accuracy of said location information comprises acquiring a designation for said accuracy with reference to preregistered internal information.

25. The location information conversion method according to claim 21, wherein an upper limit is placed on the pre-designated accuracy.

26. The location information conversion method according to claim 25, wherein the upper limit of said accuracy can be designated.

27. An operation control method for a location information providing system in which a location information conversion device, which decreases the accuracy of input location information, and a location-related information providing device, which provides location-related information related to said input location information based on location information outputted from the location information conversion device, are connected via a communications network, wherein:

said location information conversion device employs the location information conversion method according to claim 21.

28. A location information conversion method comprising decreasing the accuracy of input location information to an accuracy equal to or lower than a pre-designated accuracy in a pre-designated first unit system, and outputting the location information with the decreased accuracy.

29. The location information conversion method according to claim 28, wherein the decreasing the accuracy of said location information comprises converting said input location information into location information in the first unit system, and decreasing the accuracy of said converted input location information to an accuracy equal to or lower than said pre-designated accuracy.

30. The location information conversion method according to claim 29, wherein decreasing the accuracy of said location information further comprises:

converting the location information whose accuracy has been decreased, into location information in a pre-designated second unit system, and outputting the location information comprises outputting the location information in the pre-designated second unit system.

31. A recording medium containing a program which makes a computer execute a location information conversion method for converting input location information, wherein said method comprises decreasing the accuracy of input location information to an accuracy equal to or lower than a pre-designated accuracy, and outputting the location information with the decreased accuracy.

32. A recording medium containing a program which makes a computer execute a location information conversion method for converting input location information and producing an output, wherein said method comprises decreasing the accuracy of input location information to an accuracy equal to or lower than a pre-designated accuracy in a pre-designated first unit system, and outputting the location information with the decreased accuracy.

33. A location information conversion device, comprising location information conversion means for converting input location information into location information of an accuracy equal to or lower than a pre-designated accuracy, and for outputting the converted location information, wherein;

said location information conversion means comprises area-designated location information conversion means for converting said input location information into location information designated in relation to area information about an area which includes the location, and for outputting the converted location information; and said area-designated location information conversion means comprises:

a location-accuracy correspondence information storage for storing correspondence between first location information and a target accuracy;

an area-designated accuracy determination section which uses said input location information as said first location information, outputs accuracy for said first location information with reference to the stored correspondence, and outputs first area information that defines an area around the location defined by said first location information and that is a set of location information whose accuracy is converted into the same accuracy as that of said first location information;

an area-designated location information conversion section for converting said first location information into second location information having said same accuracy, generating second area information that defines a set of points existing in the area defined by said first area information and that becomes equal to said second location information when the accuracy of said first area information is converted into the accuracy of said first location information, and outputting said second location information and said second area information;

a converted-information cache for storing said second location information and said second area information; and a location information providing section for outputting said second location information.

34. The location information conversion device according to claim 33, wherein said location information providing section is responsive to said converted-information cache containing information corresponding to said first location information which is said input location information, to output the contained information as second location information.

35. A location information conversion device, comprising location information conversion means for converting input location information into location information of an accuracy equal to or lower than a pre-designated accuracy, and for outputting the converted location information, wherein;

said location information conversion means converts said input location information into location information having an accuracy according to the location, said location information conversion means comprises:

a location-accuracy correspondence information storage for storing correspondence between location and target accuracy;

an accuracy determination section for outputting an accuracy input location information with reference to the stored correspondence information; and a location information conversion section for converting said input location information into location information according to the accuracy output from said accuracy determination section and for outputting the converted input location information, and said location accuracy correspondence information storage further stores correspondence with time periods.

36. A control method for a location information conversion device which outputs input location information after converting the accuracy of said input location information to be no greater than a predetermined accuracy, said method comprising decreasing the accuracy of said input location information to be equal to or lower than said predetermined accuracy according to the location, and outputting the location information with the decreased accuracy.

37. The control method according to claim 36, wherein:
said location information conversion device is equipped with a location-accuracy correspondence information storage which prestores correspondence between location information and a target accuracy; and
decreasing the accuracy of said input location information comprises determining an accuracy for said input location information with reference to the prestored correspondence, and decreasing the accuracy of said input location information to the thus-determined accuracy.

38. A control method for a location information conversion device which outputs input location information after converting the accuracy of said input location information to be no greater than a predetermined accuracy, said method comprising decreasing the accuracy of said input location information to an accuracy equal to or lower than said predetermined accuracy and designated in relation to area information about an area which includes the location, and outputting the location information with the decreased accuracy.

39. A control method for a location information conversion device which outputs input location information after converting said input location information to a predetermined accuracy, said method comprising converting said input location information into location information of an accuracy equal to or lower than said predetermined accuracy and designated in relation to area information about an area which includes the location, and outputting the converted location information, wherein:
said location information conversion device comprises a location-accuracy correspondence information storage which prestores correspondence between first location information and a target accuracy, and
converting said input location information comprises:
determining an area-designated accuracy by using said input location information as said first location information, determining an accuracy for said first location information with reference to the prestored correspondence, and providing first area information that defines an area around the location defined by said first location information and that is a set of location information whose accuracy is converted into the same accuracy as that of said first location information;
providing area designated location information by converting said first location information into second location information having said same accuracy, and generating second area information that defines a set of points existing in the area defined by said first area information and that becomes equal to said second location information when the accuracy of said first area information is converted into the accuracy of said first location information;
storing said second location information and said second area information in a converted-information cache; and
outputting said second location information.

40. The control method according to claim 39, wherein outputting said second location information comprises searching said converted-information cache in response to said input location information, and if information corresponding to said first location information is found which is the input location information, outputting the search results as second location information.

41. A recording medium containing a program which makes a computer perform a method that controls a location information conversion device to output input location information after converting the accuracy of the input location information to be no greater than a predetermined accuracy, wherein said method comprises decreasing the accuracy of said input location information to be equal to or lower than said predetermined accuracy according to the location, and outputting the location information having the decreased accuracy.

42. The recording medium according to claim 41, wherein:
said location information conversion device is equipped with a location-accuracy correspondence information storage which prestores correspondence between location information and a target accuracy; and
decreasing the accuracy of said input location information comprises determining an accuracy for said input location information with reference to the prestored correspondence, and decreasing the accuracy of said input location information to the thus-determined accuracy.

43. A recording medium containing a program which makes a computer perform a method that controls a location information conversion device to output input location information after converting the accuracy of said input location information to be no greater than a predetermined accuracy, wherein said method comprises decreasing the accuracy of said input location information to an accuracy equal to or lower than said predetermined accuracy and designated in relation to area information about an area which includes the location, and outputting the location information with the decreased accuracy.

44. A recording medium containing a program which makes a computer perform a method that controls a location information conversion device to output input location information after converting said input location information according to a predetermined accuracy, wherein said method comprises converting said input location information into location information having an accuracy equal to or lower than said predetermined accuracy and designated in relation to area information about an area which includes the location, and outputting the converted location information, wherein:
said location information conversion device comprises a location-accuracy correspondence information storage which prestores correspondence between first location information and a target accuracy, and
converting said input location information comprises:
determining an area-designated accuracy by using said input location information as said first location information, outputting an accuracy for said first location information with reference to the prestored location-accuracy correspondence, and outputting first area information that defines an area around the location defined by said first location information and that is a set of location information whose accuracy is converted into the same accuracy as that of said first location information;
converting area designated location information by converting said first location information into second location information having said same accuracy, generating second area information that defines a set of points existing in the area defined by said first area information and that becomes equal to said second location information when the accuracy of said first area information is converted into the accuracy of said first location information, and outputting said second location information and said second area information; and storing said second location information and said second area information in a converted-information cache; and outputting the converted location information comprises outputting said second location information.

45. The recording medium according to claim 44, wherein outputting said second location information comprises searching said converted-information cache in response to said input location information, and if information corresponding to said first location information is found which is the input location information, outputting the search results as said second location information.

46. A location information providing system comprising a location information conversion device for converting input location information into location information of a predetermined accuracy, and a location-related information providing device for providing location-related information related to said input location information based on the converted location information, wherein:

said location information conversion device and said location-related information providing device are connected via a communications network, and said location information conversion device decreases the accuracy of said input location information to an accuracy equal to or lower than said predetermined accuracy according to the location, and outputs the converted location information.

47. The location information providing system according to claim 46, wherein said location information conversion device comprises a location-accuracy correspondence information storage for storing correspondence between location information and a target accuracy, an accuracy determination section for determining an accuracy for said input location information with reference to the stored correspondence, and a location information conversion section for decreasing the accuracy of said input location information to the thus-determined accuracy and for outputting the input location information with the decreased accuracy.

48. The location information providing system according to claim 47, wherein said location information conversion device further comprises an input/output section for changing or setting said correspondence.

49. The location information providing system according to claim 48, wherein:

said location information conversion device comprises a location measurement section for acquiring said input location information, said input/output section and said location measurement section are installed in a portable terminal, and the rest is installed in an information processing unit which can communicate with the portable terminal.

50. The location information providing system according to claim 48, wherein:

said location information conversion device comprises a location measurement section for acquiring said input location information, said input/output section, said location measurement section, and said location-accuracy correspondence information storage are installed in a portable terminal, and the rest is installed in an information processing unit which can communicate with the portable terminal.

51. The location information providing system according to claim 46, wherein said location information conversion device comprises a location measurement section for acquiring said input location information.

52. The location information providing system according to claim 46, wherein said location information conversion device is installed in a portable terminal.

53. A location information providing system comprising a location information conversion device for converting input location information into location information of a predetermined accuracy, and a location-related information providing device for providing location-related information related to said input location information based on the converted location information from said location information conversion device, wherein:

said location information conversion device and said location-related information providing device are connected via a communications network, and said location information conversion device decreases the accuracy of said input location information to an accuracy equal to or lower than said predetermined accuracy and designated in relation to area information about an area which includes the location, and outputs the location information with the decreased accuracy.

54. The location information providing system according to claim 53, wherein said location information providing device comprises a location measurement section for acquiring said first location information.

55. A location information providing system comprising a location information conversion device for converting input location information into location information of a predetermined accuracy, and a location-related information providing device for providing location-related information related to said input location information based on the converted location information from said location information conversion device, wherein:

said location information conversion device and said location-related information providing device are connected via a communications network, said location information conversion device converts said input location information into location information having an accuracy equal to or lower than said predetermined accuracy and designated in relation to area information about an area which includes the location, and outputs the converted location information, said location information conversion device comprises:

a location-accuracy correspondence information storage for storing correspondence between first location information and a target accuracy;

an area-designated accuracy determination section for using said input location information as said first location information, outputting an accuracy for said first location information with reference to the stored correspondence, and outputting first area information that defines an area around the location defined by said first location information and that is a set of location information whose accuracy is converted into the same accuracy as that of said first location information;

an area-designated location information conversion section for converting said first location information into second location information having said same accuracy, generating second area information that defines a set of points existing in the area defined by said first area information and that becomes equal to said second location information when the accuracy of said first area information is converted into the accuracy of said first location information, and outputting said second location information and said second area information;
a converted-information cache for storing said second location information and said second area information; and
a location information providing section for outputting said second location information.

56. The location information providing system according to claim 55, wherein said location information providing section searches said converted-information cache in response to said input location information, and if said location information providing section finds information corresponding to said first location information which is the input location information, said location information providing section outputs the search results as said second location information.

57. A location information providing system comprising a location information conversion device for converting input location information into location information of a predetermine accuracy, and a location-related
providing location-related information related to said input location information based on the decreased accuracy, wherein:
the accuracy of said input location information is decreased to an accuracy equal to or lower than said predetermined accuracy according to the location.

58. An operation control method for a location information providing system, said method comprising:
decreasing the accuracy of input location information to a predetermined accuracy and outputting the converted location information, and
providing location-related information related to said input location information based on the decreased accuracy, wherein:
the accuracy of said input location information is decreased to an accuracy equal to or lower than said predetermined accuracy according to the location.

59. The operation control method according to claim 58, wherein:
correspondence between location information and a target accuracy is prestored; and
the accuracy of said location information is decreased by determining an accuracy for said input location information with reference to the prestored correspondence, and decreasing the accuracy of said input location information to the thus-determined accuracy.

60. An operation control method for a location information providing system, said method comprising:
decreasing the accuracy of input location information to a predetermined accuracy, and
providing location-related information related to said input location information based on the decreased accuracy, wherein:
the accuracy of said input location information is decreased to an accuracy equal to or lower than said predetermined accuracy and designated in relation to area information about an area which includes the location.

61. An operation control method, for a location information providing system, said method comprising:
converting input location information into location information of a predetermined accuracy, and
providing location-related information related to said input location information based on the converted location information, wherein:
said input location information is converted into location information having an accuracy equal to or lower than said predetermined accuracy and designated in relation to area information about an area which includes the location,
correspondence between first location information and a target accuracy is prestored, and
said input location information is converted by:
determining an area-designated accuracy by using said input location information as said first location information, determining an accuracy for said first location information with reference to the prestored correspondence, and providing first area information that defines an area around the location defined by said first location information and that is a set of location information whose accuracy is converted into the same accuracy as that of said first location information;
converting area designated location information by converting said first location information into second location information having said same accuracy, and generating second area information that defines a set of points existing in the area defined by said first area information and that becomes equal to said second location information when the accuracy of said first area location information is converted into the accuracy of said first location information; and
storing said second location information and said second area information in a converted-information cache; and
outputting said second location information.

62. The operation control method according to claim 61, wherein outputting said second location information comprises searching said converted-information cache in response to said input location information, and if information corresponding to said first location information is found which is the input location information, outputting the search results as said second location information.

63. A location information conversion device comprising:
a location information conversion component for decreasing the accuracy of input location information to an accuracy equal to or lower than a pre-designated accuracy; and
an output component for outputting the converted location information.

64. The location information conversion device according to claim 63, wherein said location information conversion component comprises a unit system conversion part for converting said input location information into location information in a first unit system.

65. The location information conversion device according to claim 64 wherein said location information conversion component further comprises a part for converting the location information whose accuracy has been decreased into location information in a pre-designated second unit system, and for outputting the resulting location information.

* * * * *